United States Patent
Zheng et al.

(10) Patent No.: US 10,180,915 B2
(45) Date of Patent: Jan. 15, 2019

(54) METHOD AND APPARATUS FOR ACCESSING PHYSICAL RESOURCES

(71) Applicant: Huawei Technologies Co., Ltd., Shenzhen (CN)

(72) Inventors: Chen Zheng, Beijing (CN); Long Fu, Beijing (CN); Jianfeng Zhan, Beijing (CN); Lixin Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 15/160,863

(22) Filed: May 20, 2016

(65) Prior Publication Data

US 2016/0267026 A1  Sep. 15, 2016

Related U.S. Application Data

(63) Continuation of application No. PCT/CN2014/091037, filed on Nov. 13, 2014.

(30) Foreign Application Priority Data

Nov. 21, 2013 (CN) .......................... 2013 1 0594764

(51) Int. Cl.
*H04L 29/06* (2006.01)
*G06F 12/14* (2006.01)
(Continued)

(52) U.S. Cl.
CPC ........ *G06F 12/1458* (2013.01); *G06F 9/4411* (2013.01); *G06F 9/4555* (2013.01);
(Continued)

(58) Field of Classification Search
CPC .................................................. G06F 12/1458
See application file for complete search history.

(56) References Cited

U.S. PATENT DOCUMENTS

| | | | |
|---|---|---|---|
| 6,233,667 B1 * | 5/2001 | Shaylor | G06F 12/0223 711/203 |
| 6,598,144 B1 | 7/2003 | Bailey et al. | |

(Continued)

FOREIGN PATENT DOCUMENTS

| | | |
|---|---|---|
| CN | 102184373 A | 9/2011 |
| CN | 102339229 A | 2/2012 |
| CN | 102982001 A | 3/2013 |

*Primary Examiner* — Shawnchoy Rahman
(74) *Attorney, Agent, or Firm* — Leydig, Voit & Mayer, Ltd.

(57) ABSTRACT

A method and an apparatus for accessing physical resources, is used to restrict access to physical resources of other light system kernel Light OSs by a first Light OS in a multi-kernel operating system and ensure security of accessing physical resources among the Light OSs. A method, executed by secure firmware, includes: receiving a physical address corresponding to a physical resource to be accessed by the first Light OS; determining whether the physical address corresponding to the physical resource is out of bounds; and if the physical address corresponding to the physical resource is within bounds, sending an access continuity signal to the first Light OS; or if the physical address corresponding to the physical resource is out of bounds, sending an access error signal to the first Light OS.

20 Claims, 9 Drawing Sheets

(51) Int. Cl.

| | |
|---|---|
| *G06F 9/4401* | (2018.01) |
| *G06F 21/00* | (2013.01) |
| *G06F 9/455* | (2018.01) |
| *G06F 21/57* | (2013.01) |
| *G06F 21/62* | (2013.01) |
| *G06F 21/78* | (2013.01) |

(52) U.S. Cl.
CPC ............ *G06F 21/00* (2013.01); *G06F 21/572* (2013.01); *G06F 21/62* (2013.01); *G06F 21/78* (2013.01); *G06F 2009/45583* (2013.01); *G06F 2212/1052* (2013.01); *G06F 2221/2141* (2013.01)

(56) References Cited

U.S. PATENT DOCUMENTS

| | | | |
|---|---|---|---|
| 7,779,254 | B1 | 8/2010 | Crosmer et al. |
| 2011/0010483 | A1 | 1/2011 | Liljeberg |
| 2012/0331465 | A1 | 12/2012 | Tanikawa |

\* cited by examiner

METHOD AND APPARATUS FOR ACCESSING PHYSICAL RESOURCES

CROSS-REFERENCE TO RELATED APPLICATIONS

This application is a continuation of International Patent Application No. PCT/CN2014/091037, filed on Nov. 13, 2014, which claims priority to Chinese Patent Application No. 201310594764.3, filed on Nov. 21, 2013, both of which are hereby incorporated by reference in their entireties.

TECHNICAL FIELD

The present disclosure relates to the field of operating system technologies, and in particular, to a method and an apparatus for accessing physical resources.

BACKGROUND

As a data amount and a data processing requirement further increase, load imposes higher requirements on performance of an operating system. A microkernel and multiple kernels have become a future development trend of the operating system. Collaboration of multiple kernels can well isolate applications, increase a system throughput rate, and significantly improve system performance. Therefore, in face of big data processing nowadays, a virtualization technology and a multi-kernel technology are increasingly studied and applied due to high scalability. A parallel virtualization system, combined with the multi-kernel technology and the virtualization technology, ensures resource reuse and isolation, and each kernel in a multi-kernel operating system can autonomously manage memory resources.

In a conventional parallel virtualization system, a heavy system kernel (Heavy Operating System) runs on one physical node (for example, a server or a computer), where the Heavy OS manages multiple light system kernels (Light Operating System) that have independent physical resources. However, a global physical memory is visible to each Light OS. Therefore, when a Light OS kernel itself is untrusted, or a logic error occurs in a page table mapping, the Light OS kernel may access a physical memory that does not belong to the Light OS kernel, resulting in memory resource leakage of other system kernels and causing insecurity of memory resources.

SUMMARY

Embodiments of the present disclosure provide a method and an apparatus for accessing physical resources, to restrict access to physical resources of other Light OSs by a light system kernel Light OS in a multi-kernel operating system and ensure security of accessing physical resources among the Light OSs.

To achieve the foregoing objective, the following technical solutions are adopted in the embodiments of the present disclosure:

According to a first aspect, an embodiment of the present disclosure provides a method for accessing physical resources, applied to a parallel virtualization system, where the system includes a heavy system kernel Heavy OS, at least one light system kernel Light OS, and secure firmware, and the method includes:

receiving, by the secure firmware, a physical address corresponding to a physical resource to be accessed by a first Light OS, where the first Light OS is any one of the at least one Light OS;

determining, by the secure firmware, whether the physical address corresponding to the physical resource to be accessed by the first Light OS is out of bounds, where being out of bounds is that physical addresses corresponding to physical resources allocated by the Heavy OS to the first Light OS do not include the physical address corresponding to the physical resource to be accessed by the first Light OS; and sending an access continuity signal to the first Light OS, when the access of the first Light OS is within bounds, where the access continuity signal is used to indicate that the first Light OS can access the physical resource corresponding to the physical address; or sending an access error signal to the first Light OS, when the access of the first Light OS is out of bounds, where the access error signal is used to indicate that the first Light OS cannot access the physical resource corresponding to the physical address.

In a first possible implementation manner of the first aspect, the determining, by the secure firmware, whether the physical address corresponding to the physical resource to be accessed by the first Light OS is out of bounds, includes:

querying, by the secure firmware, whether stored second resource allocation mapping information includes the physical address corresponding to the physical resource to be accessed by the first Light OS, and determining whether the physical address corresponding to the physical resource to be accessed by the first Light OS is out of bounds, where the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS.

In the first possible implementation manner of the first aspect, a second possible implementation manner of the first aspect is further provided, where: the querying, by the secure firmware, whether stored second resource allocation mapping information includes the physical address corresponding to the physical resource to be accessed by the first Light OS, and determining whether the physical address corresponding to the physical resource to be accessed by the first Light OS is out of bounds, includes:

querying, by the secure firmware, whether physical addresses corresponding to the first Light OS in the currently stored second resource allocation mapping information include the physical address corresponding to the physical resource to be accessed by the first Light OS; and determining that the access of the first Light OS is within bounds, when the physical addresses corresponding to the first Light OS in the second resource allocation mapping information currently stored in the secure firmware include the physical address corresponding to the physical resource to be accessed by the first Light OS.

In the first possible implementation manner of the first aspect, a third possible implementation manner of the first aspect is further provided, where: the querying, by the secure firmware, whether stored second resource allocation mapping information includes the physical address corresponding to the physical resource to be accessed by the first Light OS, and determining whether the physical address corresponding to the physical resource to be accessed by the first Light OS is out of bounds, includes:

querying, by the secure firmware, whether physical addresses corresponding to the first Light OS in the currently stored second resource allocation mapping information include the physical address corresponding to the physical resource to be accessed by the first Light OS; and generating an access exception signal, when the physical addresses corresponding to the first Light OS in the second resource allocation mapping information currently stored in the secure firmware do not include the physical address corresponding to the physical resource to be accessed by the first Light OS, where the access exception signal is used to indicate that the second resource allocation mapping information currently stored in the secure firmware does not include the physical address corresponding to the physical resource to be accessed by the first Light OS;

sending the access exception signal to the Heavy OS, so that the Heavy OS queries the first resource allocation mapping information; and querying, by the secure firmware, second resource allocation mapping information updated by the Heavy OS, and determining that the access of the first Light OS is within bounds, when physical addresses corresponding to the first Light OS in the first resource allocation mapping information include the physical address corresponding to the physical resource to be accessed by the first Light OS, where the updated second resource allocation mapping information includes the physical address corresponding to the physical resource to be accessed by the first Light OS; or receiving an access violation instruction sent by the Heavy OS, and determining, according to the received access violation instruction, that the access of the first Light OS is out of bounds, when physical addresses corresponding to the first Light OS in the first resource allocation mapping information do not include the physical address corresponding to the physical resource to be accessed by the first Light OS, where the access violation instruction is used to indicate that the first Light OS cannot access the physical resource corresponding to the physical address.

In a fourth possible implementation manner of the first aspect, the determining, by the secure firmware, whether the physical address corresponding to the physical resource to be accessed by the first Light OS is out of bounds, includes:

loading, by the secure firmware, first resource allocation mapping information;

querying whether physical addresses corresponding to the first Light OS in the first resource allocation mapping information include the physical address corresponding to the physical resource to be accessed by the first Light OS; and determining that the access of the first Light OS is within bounds, when the physical addresses corresponding to the first Light OS in the first resource allocation mapping information include the physical address corresponding to the physical resource to be accessed by the first Light OS; or determining that the access of the first Light OS is out of bounds, when the physical addresses corresponding to the first Light OS in the first resource allocation mapping information do not include the physical address corresponding to the physical resource to be accessed by the first Light OS.

In the first aspect or any one of the foregoing four possible implementation manners of the first aspect, a fifth possible implementation manner of the first aspect is further provided, where the receiving, by the secure firmware, a physical address corresponding to a physical resource to be accessed by a first Light OS, includes:

receiving, by the secure firmware, the physical address corresponding to the physical resource to be accessed by the Light OS, where the physical address corresponding to the physical resource is sent by a cache controller; or receiving, by the secure firmware, the physical address corresponding to the physical resource to be accessed by the Light OS, where the physical address corresponding to the physical resource is sent by a memory management unit MMU.

In the first aspect or any one of the foregoing five possible implementation manners of the first aspect, a sixth possible implementation manner of the first aspect is further provided, where a data storage structure of the first resource allocation mapping information and the second resource allocation mapping information includes index items and data items, where a CPU identifier included in the Light OS is used as an index item, and a physical address of a physical resource allocated to the Light OS is used as a data item.

According to a second aspect, an embodiment of the present disclosure provides a method for accessing physical resources, applied to a parallel virtualization system, where the system includes a heavy system kernel Heavy OS, at least one light system kernel Light OS, and secure firmware, and the method includes:

sending, by a first Light OS, an access request, so that the secure firmware receives a physical address corresponding to a physical resource to be accessed by the first Light OS, and determines whether access of the first Light OS is out of bounds, where the access request includes the physical address corresponding to the physical resource to be accessed by the first Light OS, and the first Light OS is any one of the at least one Light OS;

receiving an access continuity signal or an access error signal sent by the secure firmware; and accessing the physical resource corresponding to the physical address, when the access continuity signal is received; or performing exception handling on a task that initiates the access, when the access error signal is received, where the exception handling is used to instruct the first Light OS to stop accessing the physical resource corresponding to the physical address and destroy the access request.

In a first possible implementation manner of the second aspect, the method further includes:

receiving a security detection request sent by the Heavy OS, where the security detection request is used to detect whether an exception occurs in the first Light OS;

generating, by the first Light OS, a security response signal according to the security detection request, where the security response signal is used to indicate that the first Light OS is in a normal state; and sending the security response signal to the Heavy OS within a preset time.

In the second aspect or the first possible implementation manner of the second aspect, the method further includes:

allocating a kernel object resource to each task in user space;

creating a capability table according to the kernel object resource allocated to each task, where the capability table is used to identify access permission of each task in the Light OS for the kernel object resource;

monitoring whether a process of each task violates the kernel object resource that can be accessed by each task in the capability table, and monitoring a propagation path of critical data; and performing destruction processing on the first task and/or the propagation path of the critical data, when a process of a first task in the tasks violates a kernel object resource that can be accessed by the first task in the capability table, and/or the propagation path of the critical data is modified.

In the second possible implementation manner of the second aspect, a third possible implementation manner of the second aspect is further provided, where after the process of the first task in the tasks violates the kernel object resource that can be accessed by the first task in the capability table, and/or the propagation path of the critical data is modified, the method further includes:

recording information indicating that the process of the first task violates the kernel object resource that can be accessed by the task in the capability table, when detecting that the process of the first task in the tasks violates the kernel object resource that can be accessed by the first task in the capability table; and/or recording information indicating that the propagation path of the critical data is modified, when the propagation path of the critical data is modified.

According to a third aspect, an embodiment of the present disclosure provides a method for accessing physical resources, applied to a parallel virtualization system, where the system includes a heavy system kernel Heavy OS, at least one light system kernel Light OS, and secure firmware, and the method includes:

receiving, by the Heavy OS, an access exception signal fed back by the secure firmware, where the access exception signal is used to indicate that second resource allocation mapping information currently stored in the secure firmware does not include a physical address corresponding to a physical resource to be accessed by a first Light OS, the first Light OS is any one of the at least one Light OS, and the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS;

querying, according to the received access exception signal, whether physical addresses corresponding to the first Light OS in the first resource allocation mapping information include the physical address corresponding to the physical resource to be accessed by the first Light OS; and updating a correspondence between the first Light OS and the physical address corresponding to the physical resource to be accessed by the first Light OS, to the second resource allocation mapping information stored in the secure firmware, when the physical addresses corresponding to the first Light OS include the physical address corresponding to the physical resource to be accessed by the first Light OS, so that the secure firmware determines, according to the updated second resource allocation mapping information, whether the physical address corresponding to the physical resource to be accessed by the first Light OS is out of bounds; or generating an access violation instruction, and sending the access violation instruction to the secure firmware, when the physical addresses corresponding to the first Light OS do not include the physical address corresponding to the physical resource to be accessed by the first Light OS, where the access violation instruction is used to indicate that the first Light OS cannot access the physical resource corresponding to the physical address.

In a first possible implementation manner of the third aspect, before the receiving, by the Heavy OS, an access exception signal fed back by the secure firmware, the method further includes:

allocating, by the Heavy OS, the physical resources to each Light OS;

generating the first resource allocation mapping information according to the physical resources allocated to each Light OS, and storing the first resource allocation mapping information; and storing all or some of the first resource allocation mapping information as the second resource allocation mapping information in the secure firmware.

In the first possible implementation manner of the third aspect, a second possible implementation manner of the third aspect is further provided, where before the allocating, by the Heavy OS, the physical resources to each Light OS, the method further includes:

performing an initialization setting on the secure firmware, where the initialization setting includes: setting a capacity for storing the second resource allocation mapping information in the secure firmware; and the storing all or some of the first resource allocation mapping information as the second resource allocation mapping information in the secure firmware includes: storing all or some of the first resource allocation mapping information as the second resource allocation mapping information in the secure firmware according to the capacity.

In the second possible implementation manner of the third aspect, a third possible implementation manner of the third aspect is further provided, where the initialization setting further includes: binding the secure firmware with the Heavy OS, so that the secure firmware stores or updates the second resource allocation mapping information only under control of the Heavy OS, and that the secure firmware feeds back the access exception signal only to the Heavy OS.

In a fourth possible implementation manner of the third aspect, after the receiving, by the Heavy OS, an access exception signal fed back by the secure firmware, the method further includes:

counting the number of times the secure firmware feeds back the access exception signal of the first Light OS; and destroying an exceptional access task in the first Light OS, when the number of times exceeds a preset threshold.

In the third aspect or any one of the foregoing four possible implementation manners of the third aspect, a fifth possible implementation manner of the third aspect is further provided, where the method further includes:

sending a security detection request to the first Light OS, where the security detection request is used to detect whether an exception occurs in the first Light OS; and receiving, within a preset time, a security response signal sent by the first Light OS, where the security response signal is used to indicate that the first Light OS is in a normal state; or performing restoration processing on a capability table in the first Light OS and a propagation path of critical data, when no security response signal sent by the first Light OS is received within a preset time, where the capability table is used to identify access permission of each task in the Light OS for a kernel object resource.

In the fifth possible implementation manner of the third aspect, a sixth possible implementation manner of the third aspect is further provided, where before the sending a security detection request to the first Light OS, the method further includes:

periodically recording, by the Heavy OS, capability table information of the first Light OS and propagation path information of the critical data.

In the third aspect or any one of the foregoing six possible implementation manners of the third aspect, a seventh possible implementation manner of the third aspect is further provided, where: a data storage structure of the first resource allocation mapping information and the second resource allocation mapping information includes index items and data items, where a CPU identifier included in the Light OS is used as an index item, and a physical address of a physical resource allocated to the Light OS is used as a data item.

According to a fourth aspect, an embodiment of the present disclosure provides secure firmware for accessing physical resources, applied to a parallel virtualization system, where the system further includes a heavy system kernel Heavy OS and at least one light system kernel Light OS, and the secure firmware includes:

a receiving module, configured to receive a physical address corresponding to a physical resource to be accessed by a first Light OS, where the first Light OS is any one of the at least one Light OS;

a determining module, configured to determine whether the physical address corresponding to the physical resource to be accessed by the first Light OS is out of bounds, where being out of bounds is that physical addresses corresponding to physical resources allocated by the Heavy OS to the first Light OS do not include the physical address corresponding to the physical resource to be accessed by the first Light OS; and a sending module, configured to: send an access continuity signal to the first Light OS, when the access of the first Light OS is within bounds, where the access continuity signal is used to indicate that the first Light OS can access the physical resource corresponding to the physical address; or send an access error signal to the first Light OS, when the access of the first Light OS is out of bounds, where the access error signal is used to indicate that the first Light OS cannot access the physical resource corresponding to the physical address.

In a first possible implementation manner of the fourth aspect, the determining module includes a querying unit and a determining unit, where:

the querying unit is configured to query whether stored second resource allocation mapping information includes the physical address corresponding to the physical resource to be accessed by the first Light OS; and the determining unit is configured to determine, according to a query result of the querying unit, whether the physical address corresponding to the physical resource to be accessed by the first Light OS is out of bounds; where the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS.

In the first possible implementation manner of the fourth aspect, a second possible implementation manner of the fourth aspect is further provided, where the querying unit is specifically configured to query whether physical addresses corresponding to the first Light OS in the currently stored second resource allocation mapping information include the physical address corresponding to the physical resource to be accessed by the first Light OS; and the determining unit is specifically configured to determine, that the access of the first Light OS is within bounds, when the querying unit finds that the physical addresses corresponding to the first Light OS in the currently stored second resource allocation mapping information include the physical address corresponding to the physical resource to be accessed by the first Light OS.

In the first possible implementation manner of the fourth aspect, a third possible implementation manner of the fourth aspect is further provided, where the secure firmware further includes a signal generation module, where:

the querying unit is specifically configured to query whether physical addresses corresponding to the first Light OS in the currently stored second resource allocation mapping information include the physical address corresponding to the physical resource to be accessed by the first Light OS;

the signal generation module is configured to generate an access exception signal, when the physical addresses corresponding to the first Light OS in the second resource allocation mapping information currently stored in the secure firmware do not include the physical address corresponding to the physical resource to be accessed by the first Light OS, where the access exception signal is used to indicate that the second resource allocation mapping information currently stored in the secure firmware does not include the physical address corresponding to the physical resource to be accessed by the first Light OS;

the sending module is further configured to send the access exception signal obtained by the signal generation module to the Heavy OS, so that the Heavy OS queries the first resource allocation mapping information;

the querying unit is specifically configured to query, second resource allocation mapping information updated by the Heavy OS, when physical addresses corresponding to the first Light OS in the first resource allocation mapping information include the physical address corresponding to the physical resource to be accessed by the first Light OS; and the determining unit is further configured to determine, according to a query result of the querying unit, that the access of the first Light OS is within bounds, where the updated second resource allocation mapping information includes the physical address corresponding to the physical resource to be accessed by the first Light OS; or the receiving module is further specifically configured to receive, an access violation instruction sent by the Heavy OS, when physical addresses corresponding to the first Light OS in the first resource allocation mapping information do not include the physical address corresponding to the physical resource to be accessed by the first Light OS; and the determining unit is further configured to determine, according to the access violation instruction received by the receiving module, that the access of the first Light OS is out of bounds, where the access violation instruction is used to indicate that the first Light OS cannot access the physical resource corresponding to the physical address.

In a fourth possible implementation manner of the fourth aspect, the secure firmware further includes a loading module, where:

the loading module is configured to load first resource allocation mapping information;

the querying unit is configured to query whether physical addresses corresponding to the first Light OS in the first resource allocation mapping information loaded by the loading module include the physical address corresponding to the physical resource to be accessed by the first Light OS; and the determining unit is configured to: determine that the access of the first Light OS is within bounds, when the physical addresses corresponding to the first Light OS in the first resource allocation mapping information queried by the querying unit include the physical address corresponding to the physical resource to be accessed by the first Light OS; or determine that the access of the first Light OS is out of bounds, when the physical addresses corresponding to the first Light OS in the first resource allocation mapping information queried by the querying unit do not include the physical address corresponding to the physical resource to be accessed by the first Light OS.

In the fourth aspect or any one of the foregoing four possible implementation manners of the fourth aspect, a fifth possible implementation manner of the fourth aspect is further provided, where the receiving module is specifically configured to:

receive the physical address corresponding to the physical resource to be accessed by the Light OS, where the physical address corresponding to the physical resource is sent by a cache controller; or receive the physical address corresponding to the physical resource to be accessed by the Light OS, where the physical address corresponding to the physical resource is sent by a memory management unit MMU.

In the fourth aspect or any one of the foregoing five possible implementation manners of the fourth aspect, a sixth possible implementation manner of the fourth aspect is further provided, where a data storage structure of the first resource allocation mapping information and the second resource allocation mapping information includes index items and data items, where a CPU identifier included in the Light OS is used as an index item, and a physical address of a physical resource allocated to the Light OS is used as a data item.

According to a fifth aspect, an embodiment of the present disclosure provides a light system kernel entity for accessing physical resources, applied to a parallel virtualization system, where the system further includes a heavy system kernel Heavy OS and secure firmware, and the light system kernel entity includes:

a sending module, configured to send an access request, so that the secure firmware receives a physical address corresponding to a physical resource to be accessed by a first Light OS, and determines whether access of the first Light OS is out of bounds, where the access request includes the physical address corresponding to the physical resource to be accessed by the first Light OS, and the first Light OS is any one of at least one Light OS;

a receiving module, configured to receive an access continuity signal or an access error signal sent by the secure firmware; and a handling module, configured to: access the physical resource corresponding to the physical address, when the access continuity signal is received; or perform exception handling on a task that initiates the access, when the access error signal is received, where the exception handling is used to instruct the first Light OS to stop accessing the physical resource corresponding to the physical address and destroy the access request.

In a first possible implementation manner of the fifth aspect, the light system kernel entity further includes a signal generation module, where:

the receiving module is further configured to receive a security detection request sent by the Heavy OS, where the security detection request is used to detect whether an exception occurs in the first Light OS;

the signal generation module is configured to generate a security response signal according to the security detection request received by the receiving module, where the security response signal is used to indicate that the first Light OS is in a normal state; and the sending module is further configured to send the security response signal generated by the signal generation module to the Heavy OS within a preset time.

In the fifth aspect or the first possible implementation manner of the fifth aspect, a second possible implementation manner of the fifth aspect is further provided, where the light system kernel entity further includes:

an allocation module, configured to allocate a kernel object resource to each task in user space;

a creation module, configured to create a capability table according to the kernel object resource that is allocated by the allocation module to each task, where the capability table is used to identify access permission of each task in the Light OS for the kernel object resource; and a monitoring module, configured to monitor whether a process of each task violates the kernel object resource that can be accessed by each task in the capability table and monitor a propagation path of critical data; where the handling module is further configured to: perform destruction processing on the first task and/or the propagation path of the critical data, when the monitoring module detects that a process of a first task in the tasks violates a kernel object resource that can be accessed by the first task in the capability table, and/or the propagation path of the critical data is modified.

In the second possible implementation manner of the fifth aspect, a third possible implementation manner of the fifth aspect is further provided, where the light system kernel entity further includes a recording module, where:

the recording module is configured to: record information indicating that the process of the first task violates the kernel object resource that can be accessed by the task in the capability table, when the monitoring module detects that the process of the first task in the tasks violates the kernel object resource that can be accessed by the first task in the capability table; and/or record information indicating that the propagation path of the critical data is modified, when the monitoring module detects that the propagation path of the critical data is modified.

According to a sixth aspect, an embodiment of the present disclosure provides a heavy system kernel entity for accessing physical resources, applied to a parallel virtualization system, where the system further includes at least one light system kernel Light OS and secure firmware, and the heavy system kernel entity includes:

a receiving module, configured to receive an access exception signal fed back by the secure firmware, where the access exception signal is used to indicate that second resource allocation mapping information currently stored in the secure firmware does not include a physical address corresponding to a physical resource to be accessed by a first Light OS, the first Light OS is any one of the at least one Light OS, and the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS;

a querying module, configured to query, according to the access exception signal received by the receiving module, whether physical addresses corresponding to the first Light OS in the first resource allocation mapping information include the physical address corresponding to the physical resource to be accessed by the first Light OS; and an updating module, configured to update a correspondence between the first Light OS and the physical address corresponding to the physical resource to be accessed by the first Light OS, to the second resource allocation mapping information stored in the secure firmware when the querying module finds that the physical addresses corresponding to the first Light OS include the physical address corresponding to the physical resource to be accessed by the first Light OS, so that the secure firmware determines, according to the updated second resource allocation mapping information, whether the physical address corresponding to the physical resource to be accessed by the first Light OS is out of bounds; or a signal generation module, configured to generate an access violation instruction when the physical addresses corresponding to the first Light OS do not include the physical address corresponding to the physical resource to be accessed by the first Light OS; and a sending module, configured to send the access violation instruction generated by the signal generation module to the secure firmware, where the access violation instruction is used to indicate that the first Light OS cannot access the physical resource corresponding to the physical address.

In a first possible implementation manner of the sixth aspect, the heavy system kernel entity further includes:

an allocation module, configured to allocate the physical resources to each Light OS before the receiving module receives the access exception signal fed back by the secure firmware;

a creation module, configured to create the first resource allocation mapping information according to the physical resources that are allocated by the allocation module to each Light OS, and store the first resource allocation mapping information; and a storage module, configured to store all or some of the first resource allocation mapping information generated by the creation module as the second resource allocation mapping information in the secure firmware.

In the first possible implementation manner of the sixth aspect, a second possible implementation manner of the sixth aspect is further provided, where the heavy system kernel entity further includes:

a setting module, configured to perform an initialization setting on the secure firmware before the allocation module allocates the physical resources to each Light OS, where the initialization setting includes: setting a capacity for storing the second resource allocation mapping information in the secure firmware; where the storage module is further configured to store all or some of the first resource allocation mapping information as the second resource allocation mapping information in the secure firmware according to the capacity set by the setting module.

In the second possible implementation manner of the sixth aspect, a third possible implementation manner of the sixth aspect is further provided, where the setting module is further configured to bind the secure firmware with the Heavy OS, so that the secure firmware stores or updates the second resource allocation mapping information only under control of the Heavy OS, and that the secure firmware feeds back the access exception signal only to the Heavy OS.

In a fourth possible implementation manner of the sixth aspect, the heavy system kernel entity further includes:

a counting module, configured to count, after the receiving module receives the access exception signal fed back by the secure firmware, the number of times the secure firmware feeds back the access exception signal of the first Light OS; and a handling module, configured to destroy an exceptional access task in the first Light OS when the number of times obtained by the counting module exceeds a preset threshold.

In the sixth aspect or any one of the foregoing four possible implementation manners of the sixth aspect, a fifth possible implementation manner of the sixth aspect is further provided, where:

the sending module is further configured to send a security detection request to the first Light OS, where the security detection request is used to detect whether an exception occurs in the first Light OS; and the receiving module is further configured to receive, within a preset time, a security response signal sent by the first Light OS, where the security response signal is used to indicate that the first Light OS is in a normal state; or the handling module is further configured to perform restoration processing on a capability table in the first Light OS and a propagation path of critical data when no security response signal sent by the first Light OS is received within a preset time, where the capability table is used to identify access permission of each task in the Light OS for a kernel object resource.

In the fifth possible implementation manner of the sixth aspect, a sixth possible implementation manner of the sixth aspect is further provided, where the heavy system kernel entity further includes a recording module, where the recording module is configured to periodically record capability table information of the first Light OS and propagation path information of the critical data before the sending module sends the security detection request to the first Light OS.

In the sixth aspect or any one of the foregoing six possible implementation manners of the sixth aspect, a seventh possible implementation manner of the sixth aspect is further provided, where: a data storage structure of the first resource allocation mapping information and the second resource allocation mapping information includes index items and data items, where a CPU identifier included in the Light OS is used as an index item, and a physical address of a physical resource allocated to the Light OS is used as a data item.

According to a seventh aspect, an embodiment of the present disclosure provides a system for accessing physical resources, including the secure firmware in the fourth aspect or any one of the possible implementation manners of the fourth aspect, the light system kernel entity in the fifth aspect or any one of the possible implementation manners of the fifth aspect, the heavy system kernel entity in the sixth aspect or any one of the possible implementation manners of the sixth aspect.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, each independent Light OS ensures, by monitoring a capability operation of a task process, access permission of the task process in the Light OS for a kernel object resource, therefore further ensuring robustness of the Light OS against an untrusted task. In addition, a Heavy OS performs security detection on the Light OS to ensure functional completeness of the Light OS.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present shall fall within the protection scope of the present disclosure.

An embodiment of the present disclosure provides a system for accessing physical resources, where the system includes: a heavy system kernel (Heavy Operating System), at least one light system kernel (Light Operating System), secure firmware (Secure Ware), and a memory.

The physical resources may be physical memory resources or may be hardware device resources such as a hard disk, a network adapter or other peripheral component interconnect (PCI) devices, which are not limited certainly.

The Heavy OS is a management system kernel in a multi-kernel operating system, and is configured to: distribute, manage, and schedule tasks; perform operations on the secure firmware such as an initialization setting, exception handling, and resetting to ensure security and validity of accessing the physical resources by the Light OS; and perform security detection on the Light OS to ensure functional completeness of the Light OS.

The Light OS is an application system kernel in the multi-kernel operating system, and is configured to access the physical resources according to independent memory resources and address space allocated by the Heavy OS to the Light OS; in addition, the Light OS encapsulates kernel resources of the Light OS to ensure robustness of the Light OS against an untrusted task, and accepts the security detection performed by the Heavy OS to ensure functional completeness of the Light OS.

The secure firmware is configured to verify validity of accessing physical memory resources by the Light OS, to restrict access to physical resources of other Light OSs by the Light OS and ensure security of physical resources.

The memory is configured to store a physical resource to be accessed by the Light OS.

Figure 1:
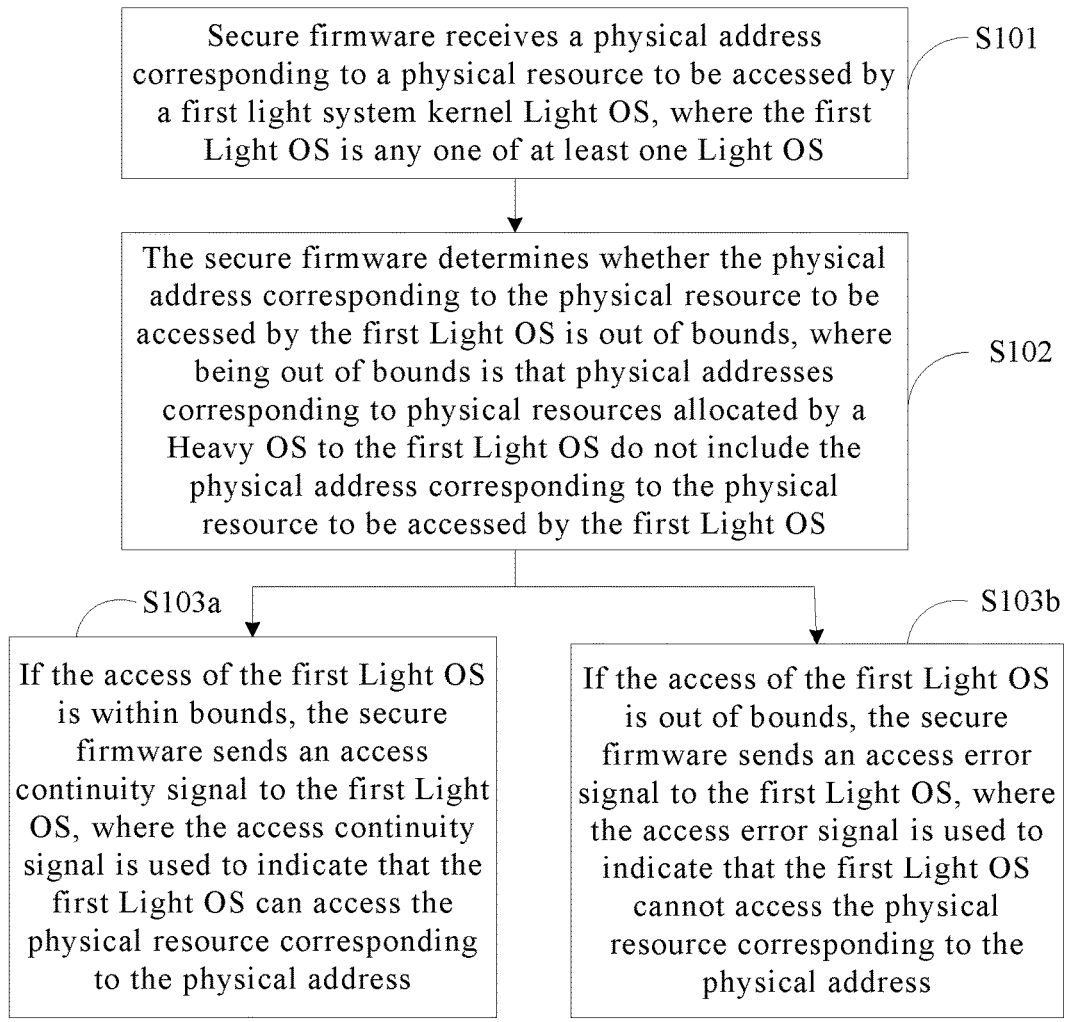
FIG. 1 is a schematic flowchart diagram of a method for accessing physical resources according to an embodiment of the present disclosure.

For the foregoing system, an embodiment of the present disclosure provides a method for accessing physical resources. In this method, an execution entity of this method is the secure firmware, and as shown in FIG. 1, the method includes:

S101. The secure firmware receives a physical address corresponding to a physical resource to be accessed by a first light system kernel Light OS, where the first Light OS is any one of the at least one Light OS.

The secure firmware is hardware for implementing validity verification of memory access, and the secure firmware may be implemented on a memory controller, or may be implemented on a memory management unit (MMU), which is not limited certainly.

The first light system kernel Light OS is responsible for providing an environment for system service and application execution, where the multi-kernel operating system includes at least one light system kernel.

Specifically, that the secure firmware receives a physical address corresponding to a physical resource to be accessed by a first light system kernel Light OS includes:

the secure firmware receives the physical address corresponding to the physical resource to be accessed by the Light OS, where the physical address corresponding to the physical resource is sent by a cache controller; or the secure firmware receives the physical address corresponding to the physical resource to be accessed by the Light OS, where the physical address corresponding to the physical resource is sent by a memory management unit MMU.

Optionally, when the secure firmware is implemented on the memory controller, the first Light OS sends, to the MMU, a request for accessing a physical resource corresponding to a physical address. The MMU converts a virtual address in the request into a physical address. Then the MMU sends the physical address to the Cache controller, and the Cache controller detects whether the physical address exists in the Cache. A physical resource hit corresponding to the physical address is returned to the first Light OS, when the physical address exists in the Cache; a cache miss (Cache miss) is generated and then a memory is accessed, when the physical address does not exist in the Cache. Because the memory is accessed through the secure firmware on the memory controller, the secure firmware receives the physical address corresponding to the physical resource to be accessed by the Light OS, where the physical address corresponding to the physical resource is sent by the cache controller.

Optionally, when the secure firmware is implemented on the MMU, the first Light OS sends, to the MMU, a request for accessing a physical resource corresponding to a physical address. The MMU converts a virtual address in the request into a physical address. Then the MMU sends the physical address to the secure firmware, and therefore, the secure firmware receives the physical address corresponding to the physical resource to be accessed by the Light OS, where the physical address corresponding to the physical resource is sent by the memory management unit MMU.

S102. The secure firmware determines whether the physical address corresponding to the physical resource to be accessed by the first Light OS is out of bounds, where being out of bounds is that physical addresses corresponding to physical resources allocated by the Heavy OS to the first Light OS do not include the physical address corresponding to the physical resource to be accessed by the first Light OS.

That the secure firmware determines whether the physical address corresponding to the physical resource to be accessed by the first Light OS is out of bounds includes two cases: The secure firmware determines that the physical address corresponding to the physical resource to be accessed by the first Light OS is within bounds, and the secure firmware determines that the physical address corresponding to the physical resource to be accessed by the first Light OS is out of bounds.

The case in which the secure firmware determines whether the physical address corresponding to the physical resource to be accessed by the first Light OS is out of bounds may be determined by using two different methods. The first method is that the secure firmware determines, by querying second resource allocation mapping information stored by the secure firmware, whether the physical address corresponding to the physical resource to be accessed by the first Light OS is out of bounds. The second method is that the secure firmware determines, by querying a first resource allocation mapping information, whether the physical address corresponding to the physical resource to be accessed by the first Light OS is out of bounds.

Specifically, for the first method, that the secure firmware determines whether the physical address corresponding to the physical resource to be accessed by the first Light OS is out of bounds includes: The secure firmware queries whether the stored second resource allocation mapping information includes the physical address corresponding to the physical resource to be accessed by the first Light OS, and determines whether the physical address corresponding to the physical resource to be accessed by the first Light OS is out of bounds, where the second resource allocation mapping information includes all or some of the first resource allocation mapping information, where the first resource allocation mapping information is stored in the Heavy OS, and is a correspondence between physical addresses corresponding to physical resources allocated by the Heavy OS to each Light OS and each Light OS.

The first method may further include two cases. The following describes the two different cases (two different cases A and B) in detail.

A. The secure firmware determines, by using the currently stored second resource allocation mapping information, that the physical address corresponding to the physical resource to be accessed by the first Light OS is within bounds. The steps of case A includes A1 and A2.

A1. The secure firmware queries whether physical addresses corresponding to the first Light OS in the currently stored second resource allocation mapping information include the physical address corresponding to the physical resource to be accessed by the first Light OS.

A2. The secure firmware determine that the access of the first Light OS is within bounds, when the physical addresses corresponding to the first Light OS in the second resource allocation mapping information currently stored in the secure firmware include the physical address corresponding to the physical resource to be accessed by the first Light OS.

B. The secure firmware determines, by using the second resource allocation mapping information updated and stored by the secure firmware, that the physical address corresponding to the physical resource to be accessed by the first Light OS is within bounds. The steps of case B includes B1, B2, B3, B4 and B5.

B1. The secure firmware queries whether physical addresses corresponding to the first Light OS in the currently stored second resource allocation mapping information include the physical address corresponding to the physical resource to be accessed by the first Light OS.

B2. Generate an access exception signal, when the physical addresses corresponding to the first Light OS in the second resource allocation mapping information currently stored in the secure firmware do not include the physical address corresponding to the physical resource to be accessed by the first Light OS, where the access exception signal is used to indicate that the second resource allocation mapping information currently stored in the secure firmware does not include the physical address corresponding to the physical resource to be accessed by the first Light OS.

B3. Send the access exception signal to the Heavy OS, so that the Heavy OS queries the first resource allocation mapping information.

B4. The secure firmware queries second resource allocation mapping information updated by the Heavy OS, and determines that the access of the first Light OS is within bounds, when physical addresses corresponding to the first Light OS in the first resource allocation mapping information include the physical address corresponding to the physical resource to be accessed by the first Light OS, where the updated second resource allocation mapping information includes the physical address corresponding to the physical resource to be accessed by the first Light OS.

B5. Receive an access violation instruction sent by the Heavy OS, and determine, according to the received access violation instruction, that the access of the first Light OS is out of bounds, when physical addresses corresponding to the first Light OS in the first resource allocation mapping information do not include the physical address corresponding to the physical resource to be accessed by the first Light OS, where the access violation instruction is used to indicate that the first Light OS cannot access the physical resource corresponding to the physical address.

Specifically, for the second method, the case in which the secure firmware determines, by querying the first resource allocation mapping information, that the physical address corresponding to the physical resource to be accessed by the first Light OS is within bounds, is described in detail. The steps of this case includes:

loading, by the secure firmware, the first resource allocation mapping information;

querying whether physical addresses corresponding to the first Light OS in the first resource allocation mapping information include the physical address corresponding to the physical resource to be accessed by the first Light OS; and determining that the access of the first Light OS is within bounds, when the physical addresses corresponding to the first Light OS in the first resource allocation mapping information include the physical address corresponding to the physical resource to be accessed by the first Light OS; or determining that the access of the first Light OS is out of bounds, when the physical addresses corresponding to the first Light OS in the first resource allocation mapping information do not include the physical address corresponding to the physical resource to be accessed by the first Light OS.

Step S103a is performed, when the access of the first Light OS is within bounds; step S103b is performed, when the access of the first Light OS is out of bounds.

S103a. The secure firmware sends an access continuity signal to the first Light OS, when the access of the first Light OS is within bounds, where the access continuity signal is used to indicate that the first Light OS can access the physical resource corresponding to the physical address.

That the first Light OS accesses, under control of the secure firmware, the physical resource corresponding to the physical address, includes:

the first Light OS accesses the physical resource corresponding to the physical address in the cache controller; or the first Light OS accesses the physical resource corresponding to the physical address in the memory.

Optionally, if the Cache controller does not have the physical address corresponding to the physical resource to be accessed by the first Light OS, and when the secure firmware is implemented on the memory controller, the physical addresses corresponding to the first Light OS in the second resource allocation mapping information stored in the secure firmware include the physical address, the first Light OS is controlled to access the physical resource corresponding to the physical address in the memory; and further, the physical address is cached to a Cache of a CPU that sends the access request, to ensure that when the physical address is accessed next time, the physical resource corresponding to the physical address can be hit directly in the Cache without using the secure firmware.

Optionally, if the secure firmware is implemented on the MMU, and the physical addresses corresponding to the first Light OS in the second resource allocation mapping information stored in the secure firmware include the physical address, the first Light OS is controlled to access the physical resource corresponding to the physical address in the cache. The physical resource corresponding to the physical address is returned to the first Light OS, when the cache stores the physical address; the first Light OS continues to access the physical resource corresponding to the physical address in the memory, when the cache does not store the physical address. Further, the physical address is cached to a Cache of a CPU that sends the access request, to ensure that when the physical address is accessed next time, the physical resource corresponding to the physical address can be hit directly in the Cache.

Optionally, if the Cache controller does not have the physical address corresponding to the physical resource to be accessed by the first Light OS, and physical addresses corresponding to a CPU identifier included in the first Light OS in the first resource allocation mapping information include the physical address when the secure firmware is implemented on the memory controller, the first Light OS is controlled to access the physical resource corresponding to the physical address in the memory. Further, the physical address is cached to a Cache of a CPU that sends the access request, to ensure that when the physical address is accessed next time, the physical resource corresponding to the physical address can be hit directly without using the secure firmware.

Optionally, if the secure firmware is implemented on the MMU, and the physical addresses corresponding to a CPU identifier included in the first Light OS in the first resource allocation mapping information include the physical address, the first Light OS is controlled to access the physical resource corresponding to the physical address in the cache. The physical resource corresponding to the physical address is returned to the first Light OS, when the cache stores the physical address; The first Light OS is controlled to continue to access the physical resource corresponding to the physical address in the memory, when the cache does not store the physical address. Further, the physical address is cached to a Cache of a CPU that sends the access request, to ensure that when the physical address is accessed next time, the physical resource corresponding to the physical address can be hit directly in the Cache.

S103b. The secure firmware sends an access error signal to the first Light OS, when the access of the first Light OS is out of bounds, where the access error signal is used to indicate that the first Light OS cannot access the physical resource corresponding to the physical address.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs.

Figure 2:
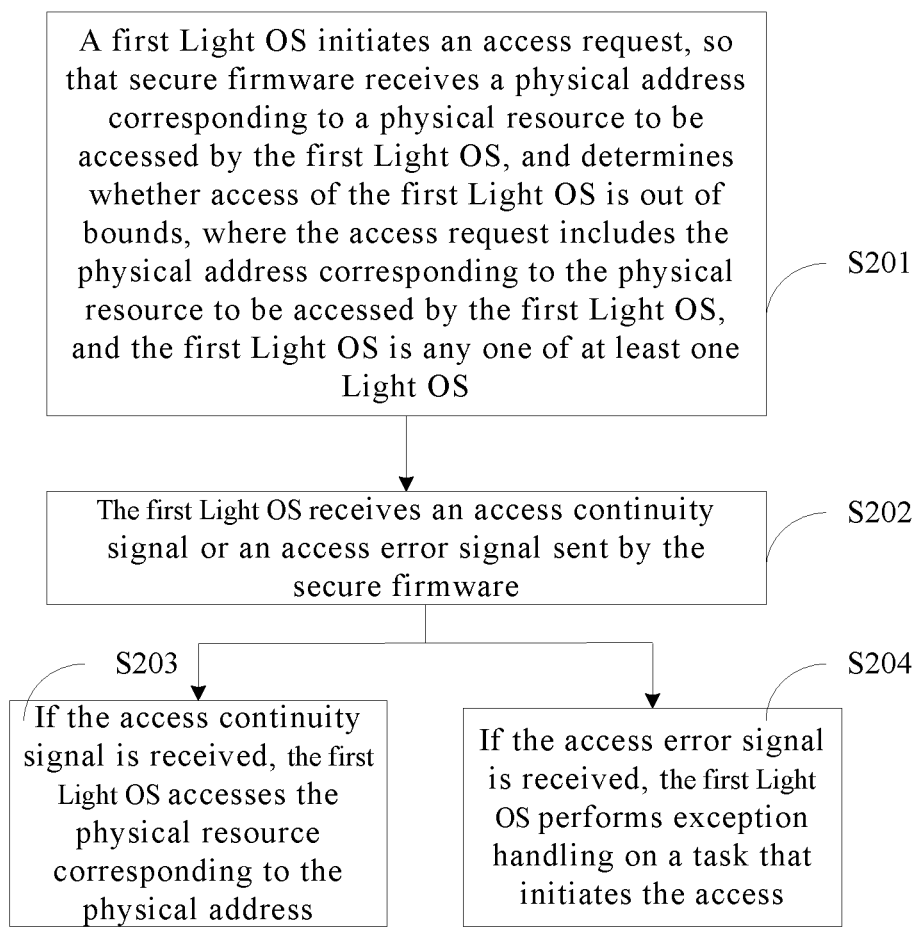
FIG. 2 is a schematic flowchart diagram of another method for accessing physical resources according to an embodiment of the present disclosure.

For the foregoing system, an embodiment of the present disclosure provides a method for accessing physical resources, where the method is performed by a Light OS. As shown in FIG. 2, specific steps include:

S201. A first Light OS sends an access request, so that the secure firmware receives a physical address corresponding to a physical resource to be accessed by the first Light OS, and determines whether access of the first Light OS is out of bounds, where the access request includes the physical address corresponding to the physical resource to be accessed by the first Light OS, and the first Light OS is any one of the at least one Light OS.

Specifically, the secure firmware receives the physical address and determines whether the access of the first Light OS is out of bounds, which is not further described herein. For details, reference may be made to the foregoing steps S101 and S102.

S202. The first Light OS receives an access continuity signal or an access error signal sent by the secure firmware.

The access continuity signal is used to indicate that the first Light OS can access the physical resource corresponding to the physical address, and the access error signal is used to indicate that the first Light OS cannot access the physical resource corresponding to the physical address.

S203. The first Light OS accesses the physical resource corresponding to the physical address, when the access continuity signal is received.

That the first Light OS accesses the physical resource corresponding to the physical address includes:

the first Light OS accesses the physical resource corresponding to the physical address in a cache controller; or the first Light OS accesses the physical resource corresponding to the physical address in a memory.

Optionally, if the Cache controller does not have the physical address corresponding to the physical resource to be accessed by the first Light OS, and when the secure firmware is implemented on a memory controller, physical addresses corresponding to the first Light OS in second resource allocation mapping information stored in the secure firmware include the physical address, the first Light OS is controlled to access the physical resource corresponding to the physical address in the memory; and further, the physical address is cached to a Cache of a CPU that sends the access request, to ensure that when the physical address is accessed next time, the physical resource corresponding to the physical address can be hit directly without using the secure firmware.

Optionally, if the secure firmware is implemented on an MMU, and physical addresses corresponding to the first Light OS in second resource allocation mapping information stored in the secure firmware include the physical address, the first Light OS is controlled to access the physical resource corresponding to the physical address in a cache; the physical resource corresponding to the physical address is returned to the first Light OS, when the cache stores the physical address; or the first Light OS continues to access the physical resource corresponding to the physical address in the memory, when the cache does not store the physical address; and further, the physical address is cached to a Cache of a CPU that sends the access request, to ensure that when the physical address is accessed next time, the physical resource corresponding to the physical address can be hit directly in the Cache.

Optionally, if the Cache controller does not have the physical address corresponding to the physical resource to be accessed by the first Light OS, and when the secure firmware is implemented on a memory controller, physical addresses corresponding to a CPU identifier included in the first Light OS in a first resource allocation mapping information include the physical address, the first Light OS is controlled to access the physical resource corresponding to the physical address in the memory; and further, the physical address is cached to a Cache of a CPU that sends the access request, to ensure that when the physical address is accessed next time, the physical resource corresponding to the physical address can be hit directly without using the secure firmware.

Optionally, if the secure firmware is implemented on an MMU, and physical addresses corresponding to a CPU identifier included in the first Light OS in a first resource allocation mapping information include the physical address, the first Light OS is controlled to access the physical resource corresponding to the physical address in a cache; the physical resource corresponding to the physical address is returned to the first Light OS, when the cache stores the physical address; or the first Light OS is controlled to continue to access the physical resource corresponding to the physical address in the memory, when the cache does not store the physical address; and further, the physical address is cached to a Cache of a CPU that sends the access request, to ensure that when the physical address is accessed next time, the physical resource corresponding to the physical address can be hit directly in the Cache.

S204. The first Light OS performs exception handling on a task that initiates the access, when the access error signal is received, where the exception handling is used to instruct the first Light OS to stop accessing the physical resource corresponding to the physical address and destroy the access request.

Specifically, the exception handling may be that the first Light OS stops the access request, or may be that the first Light OS directly destroys the access request, which is not limited certainly. The exception handling ensures validity and security of accessing physical resources by the first Light OS.

Optionally, as known from the foregoing system, the Heavy OS needs to perform security detection on the first Light OS to ensure functional completeness of the Light OS. Therefore, the first Light OS may perform the following steps to ensure functional completeness of the Light OS, including:

receiving a security detection request sent by the Heavy OS, where the security detection request is used to detect whether an exception occurs in the first Light OS;

generating, by the first Light OS, a security response signal according to the security detection request, where the security response signal is used to indicate that the first Light OS is in a normal state; and sending the security response signal to the Heavy OS within a preset time.

That is, functions of the first Light OS are complete, when the first Light OS generates the security response signal according to the security detection request, and sends the security response signal to the Heavy OS within the preset time; functions of the first Light OS are incomplete, when the first Light OS generates the security response signal according to the security detection request, but does not send the security response signal to the Heavy OS within the preset time; functions of the first Light OS are also incomplete, when the first Light OS does not generate the security response signal according to the security detection request.

Optionally, the first Light OS may further allocate independent memory resources and address space according to a used operating system, perform permission management in fine granularity on kernel resources by using a capability mechanism, and ensure correctness of the capability mechanism by monitoring an access path of a process. The method includes:

allocating a kernel object resource to each task in user space;

creating a capability table according to the kernel object resource allocated to each task, where the capability table is used to identify access permission of each task in the Light OS for the kernel object resource;

monitoring whether a process of each task violates the kernel object resource that can be accessed by each task in the capability table, and monitoring a propagation path of critical data; and performing destruction processing on the first task and/or the propagation path of the critical data, when a process of a first task in the tasks violates a kernel object resource that can be accessed by the first task in the capability table, and/or the propagation path of the critical data is modified.

Optionally, information indicating that the process of the first task violates the kernel object resource that can be accessed by the task in the capability table is recorded, when it is detected that the process of the first task in the tasks violates the kernel object resource that can be accessed by the first task in the capability table; and/or information indicating that the propagation path of the critical data is modified is recorded, when the propagation path of the critical data is modified.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, each independent Light OS ensures, by monitoring a capability operation of a task process, access permission of the task process in the Light OS for a kernel object resource, therefore further ensuring robustness of the Light OS against an untrusted task. In addition, security detection is performed on the Light OS by a Heavy OS to ensure functional completeness of the Light OS.

Figure 3:
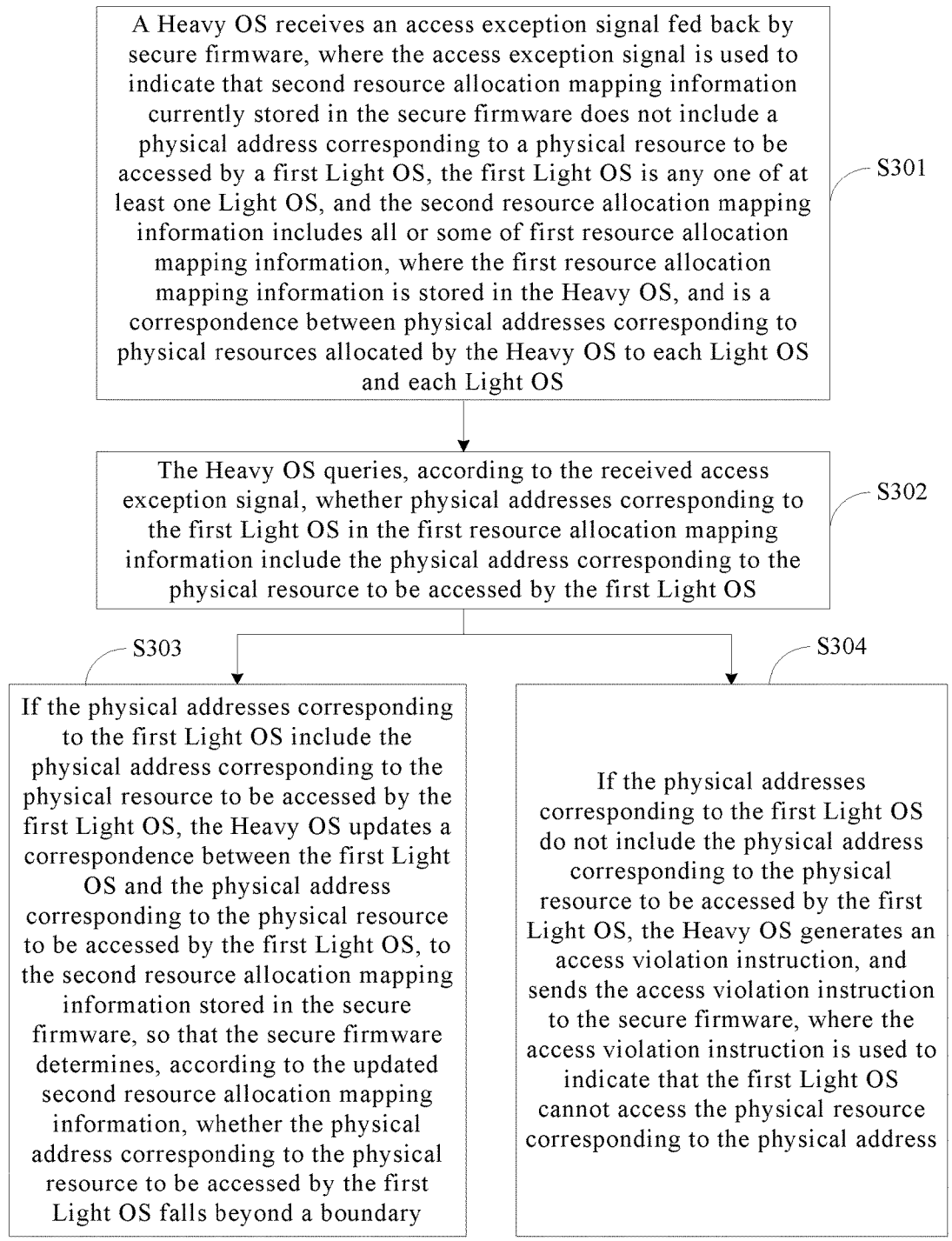
FIG. 3 is a schematic flowchart diagram of another method for accessing physical resources according to an embodiment of the present disclosure.

For the foregoing system, an embodiment of the present disclosure provides a method for accessing physical resources, where the method is performed by a Heavy OS. As shown in FIG. 3, specific steps include:

S301. The Heavy OS receives an access exception signal fed back by the secure firmware, where the access exception signal is used to indicate that second resource allocation mapping information currently stored in the secure firmware does not include a physical address corresponding to a physical resource to be accessed by a first Light OS, the first Light OS is any one of the at least one Light OS, and the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS.

A data storage structure of the first resource allocation mapping information and the second resource allocation mapping information includes index items and data items, where a CPU identifier included in the Light OS is used as an index item, and a physical address of a physical resource allocated to the Light OS is used as a data item.

Specifically, when the secure firmware receives the physical address corresponding to the physical resource to be accessed by the first Light OS, the secure firmware finds that the currently stored second resource allocation mapping information does not include the physical address corresponding to the physical resource to be accessed by the first Light OS, and the secure firmware generates the access exception signal, and sends the access exception signal to the Heavy OS; correspondingly, the Heavy OS receives the access exception signal fed back by the secure firmware.

S302. The Heavy OS queries, according to the received access exception signal, whether physical addresses corresponding to the first Light OS in the first resource allocation mapping information include the physical address corresponding to the physical resource to be accessed by the first Light OS.

A data storage structure of the first resource allocation mapping information includes index items and data items, where a CPU identifier included in the Light OS is used as an index item, and a physical address of a physical resource allocated to the Light OS is used as a data item.

Step S303 continues to be performed, when the physical addresses corresponding to the first Light OS include the physical address; step S304 continues to be performed, when the physical addresses corresponding to the first Light OS do not include the physical address.

S303. the Heavy OS updates a correspondence between the first Light OS and the physical address corresponding to the physical resource to be accessed by the first Light OS, to the second resource allocation mapping information stored in the secure firmware, when the physical addresses corresponding to the first Light OS include the physical address corresponding to the physical resource to be accessed by the first Light OS, so that the secure firmware determines, according to the updated second resource allocation mapping information, whether the physical address corresponding to the physical resource to be accessed by the first Light OS is out of bounds.

A data storage structure of the second resource allocation mapping information includes index items and data items, where a CPU identifier included in the Light OS is used as an index item, and a physical address of a physical resource allocated to the Light OS is used as a data item.

S304. The Heavy OS generates an access violation instruction, and send the access violation instruction to the secure firmware, when the physical addresses corresponding to the first Light OS do not include the physical address corresponding to the physical resource to be accessed by the first Light OS, where the access violation instruction is used to indicate that the first Light OS cannot access the physical resource corresponding to the physical address.

Specifically, the secure firmware stores all or some of resource allocation mapping information of the first Light OS. attribute flag of the resource allocation mapping information of the first Light OS stored in the secure firmware of the first Light OS may be set, to indicate that the secure firmware does not store the physical address of the first Light OS, when the physical addresses corresponding to the first Light OS in the first resource allocation mapping information do not include the physical address.

Further, before step S301, the method includes:

allocating, by the Heavy OS, the physical resources to each Light OS;

generating the first resource allocation mapping information according to the physical resources allocated to each Light OS, and storing the first resource allocation mapping information; and storing all or some of the first resource allocation mapping information as the second resource allocation mapping information in the secure firmware.

Further, before the allocating, by the Heavy OS, the physical resources to each Light OS, the method further includes:

performing an initialization setting on the secure firmware, where the initialization setting includes: setting a capacity for storing the second resource allocation mapping information in the secure firmware; and the storing all or some of the first resource allocation mapping information as the second resource allocation mapping information in the secure firmware includes: storing all or some of the first resource allocation mapping information as the second resource allocation mapping information in the secure firmware according to the capacity.

The initialization setting further includes: binding the secure firmware with the Heavy OS, so that the secure firmware stores or updates the second resource allocation mapping information only under control of the Heavy OS, and that the secure firmware feeds back the access exception signal only to the Heavy OS.

Specifically, the binding the secure firmware with the Heavy OS may be setting an identifier of the Heavy OS in the secure firmware, so that when any CPU in the multi-kernel operating system sends a signal to the secure firmware, the secure firmware determines, according to an identifier of the CPU that sends the signal, whether the identifier of the CPU is an identifier of the Heavy OS or is an identifier of the Light OS, to ensure a unique authority of setting function of the Heavy OS for the secure firmware and a unique authority for storage and update of the second resource allocation mapping information in the secure firmware; in addition, the secure firmware feeds back the access exception signal only to the Heavy OS.

Further, after step S304, after the Heavy OS receives the access exception signal fed back by the secure firmware, the method further includes:

counting the number of times the secure firmware feeds back the access exception signal of the first Light OS; and destroying an exceptional access task in the first Light OS, when the number of times exceeds a preset threshold.

Performing exception handling on the first Light OS may be performing isolation processing on the first Light OS, or may be performing destruction processing on the first Light OS, which is not limited certainly.

Optionally, as known from the foregoing system, the Heavy OS needs to perform security detection on the first Light OS to ensure functional completeness of the first Light OS. Therefore, the Heavy OS may perform the following steps to perform security detection on the first Light OS, including:

sending a security detection request to the first Light OS, where the security detection request is used to detect whether an exception occurs in the first Light OS; and receiving, within a preset time, a security response signal sent by the first Light OS, where the security response signal is used to indicate that the first Light OS is in a normal state; or performing restoration processing on a capability table in the first Light OS and a propagation path of critical data, when no security response signal sent by the first Light OS is received within a preset time, where the capability table is used to identify access permission of each task in the Light OS for a kernel object resource.

Optionally, before the Heavy OS sends the security detection request to the first Light OS, the Heavy OS periodically records capability table information of the first Light OS and propagation path information of the critical data, so that when no security response signal sent by the first Light OS is received within the preset time, restoration processing is performed on the capability table in the first Light OS and the propagation path of the critical data.

In the embodiment of the present disclosure, secure firmware for accessing physical resources is added, so that when a Light OS in a multi-kernel operating system initiates physical resource access, the secure firmware verifies validity of memory access by the Light OS, to restrict access to physical resources of other Light OSs by the Light OS and ensure security of accessing physical resources among the Light OSs. Further, a Heavy OS performs security detection on the Light OS to ensure functional completeness of the Light OS.

Embodiment 1

Figure 4:
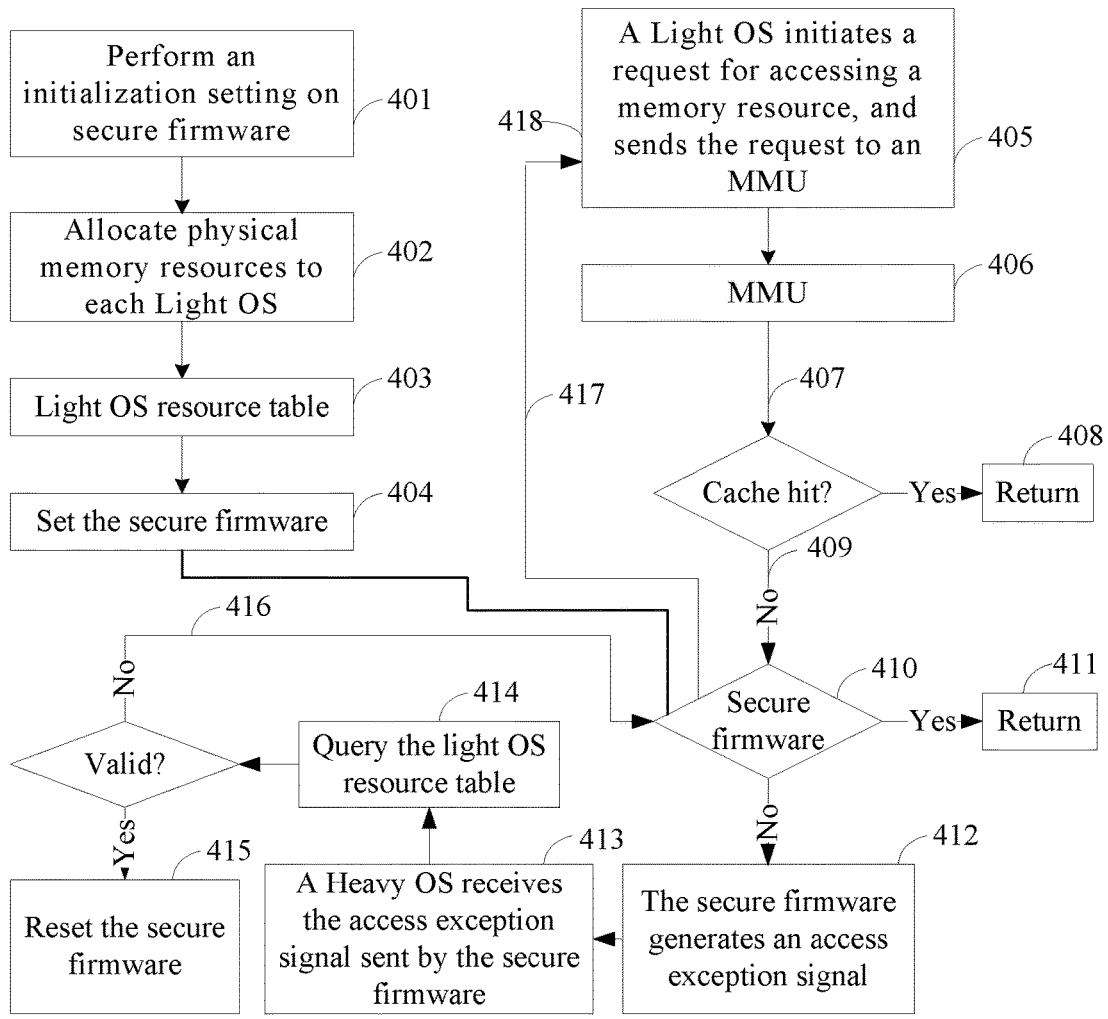
FIG. 4 is a schematic flowchart diagram of a method for accessing physical resources according to an embodiment of the present disclosure.

According to the foregoing system, the following provides a specific implementation solution to a method for accessing physical resources. As shown in FIG. 4, specifically the following steps are included:

Step 401: When started, a Heavy OS performs an initialization setting on secure firmware.

The initialization setting is performed on the secure firmware, where the initialization setting includes: setting a capacity for storing second resource allocation mapping information in the secure firmware; and binding the secure firmware with the Heavy OS, so that the secure firmware stores or updates the second resource allocation mapping information only under control of the Heavy OS, and that the secure firmware feeds back an access exception signal only to the Heavy OS.

The second resource allocation mapping information may be a correspondence between a CPU included in a Light OS and physical addresses of all or some of physical resources allocated by the Heavy OS to the CPU included in the Light OS.

Exemplarily, if the Heavy OS includes a CPU0, the initialization setting includes: setting an address range that can be stored by the secure firmware, of an access memory, to 4Q and binding the Heavy OS with the secure firmware, that is, setting an attribute flag identifying the CPU0 in the secure firmware.

Step 402: The Heavy OS allocates physical memory resources to each Light OS.

Step 403: The Heavy OS generates first resource allocation mapping information according to the physical memory resources allocated to each Light OS, and stores the first resource allocation mapping information.

The first resource allocation mapping information may be a Light OS resource table. The Light OS resource table includes index items and data items, where a CPU identifier included in the Light OS is used as an index item, and a physical address of a physical resource allocated to the Light OS is used as a data item.

Step 404: The Heavy OS stores all or some of the first resource allocation mapping information as second resource allocation mapping information in the secure firmware.

The second resource allocation mapping information may be a part or all of the Light OS resource table. The Light OS resource table includes index items and data items, where a CPU identifier included in the Light OS is used as an index item, and a physical address of a physical resource allocated to the Light OS is used as a data item.

Exemplarily, the Heavy OS divides the 4G address range that can be stored by the secure firmware, of the access memory, into different areas, where each area records some or all of physical addresses that can be accessed by a Light OS in the Light OS resource table.

Step 405: A first light system kernel Light OS initiates a request for accessing a memory resource, and sends the request to an MMU.

Step 406: The MMU converts a virtual address in the request for accessing the memory resource into a physical address.

Step 407: The MMU sends the physical address to a Cache; correspondingly, the Cache receives the physical address sent by the MMU.

Step 408: The Cache returns, to the first Light OS, the memory resource corresponding to the physical address, when the Cache stores the physical address.

Step 409: The Cache sends the physical address to the secure firmware, when the Cache does not store the physical address; correspondingly, the secure firmware receives the physical address sent by the Cache.

Step 410: The secure firmware determines, according to a part or all of a Light OS resource table stored by the secure firmware, whether the physical address corresponding to the physical resource to be accessed by the first Light OS is out of bounds.

Step 411: The secure firmware controls the first Light OS to access the physical memory resource corresponding to the physical address in the memory, when the physical address corresponding to the physical resource to be accessed by the first Light OS is within bounds.

Step 412: The secure firmware generates an access exception signal, when the physical address corresponding to the physical resource to be accessed by the first Light OS is out of bounds.

Step 413: The secure firmware sends the access exception signal to the Heavy OS; correspondingly, the Heavy OS receives the access exception signal sent by the secure firmware.

Step 414: The Heavy OS detects, according to the received access exception signal sent by the secure firmware, whether physical addresses corresponding to the first Light OS in the Light OS resource table include the physical address.

Step 415: The Heavy OS updates a correspondence between the first Light OS and the physical address to the second resource allocation mapping information stored in the secure firmware, when it is detected that the physical addresses corresponding to the first Light OS in the Light OS resource table include the physical address, so that the first Light OS accesses the physical memory resource corresponding to the physical address in the memory.

Step 416: The Heavy OS generates an access violation instruction, and sends the access violation instruction to the secure firmware, when it is detected that the physical addresses corresponding to the first Light OS in the Light OS resource table do not include the physical address; correspondingly, the secure firmware receives the access violation instruction sent by the Heavy OS.

Step 417: The secure firmware generates an access error signal according to the received access violation instruction, and sends the access error signal to the first Light OS; correspondingly, the first Light OS receives the access error signal sent by the secure firmware.

Step 418: The first Light OS performs, according to the received access error signal, exception processing on a task that initiates the access.

In the embodiment of the present disclosure, secure firmware for accessing physical resources is added, so that when a Light OS in a multi-kernel operating system initiates physical resource access, the secure firmware verifies validity of memory access by the Light OS, to restrict access to physical resources of other Light OSs by the Light OS and ensure security of accessing physical resources among the Light OSs.

Embodiment 2

Figure 5:
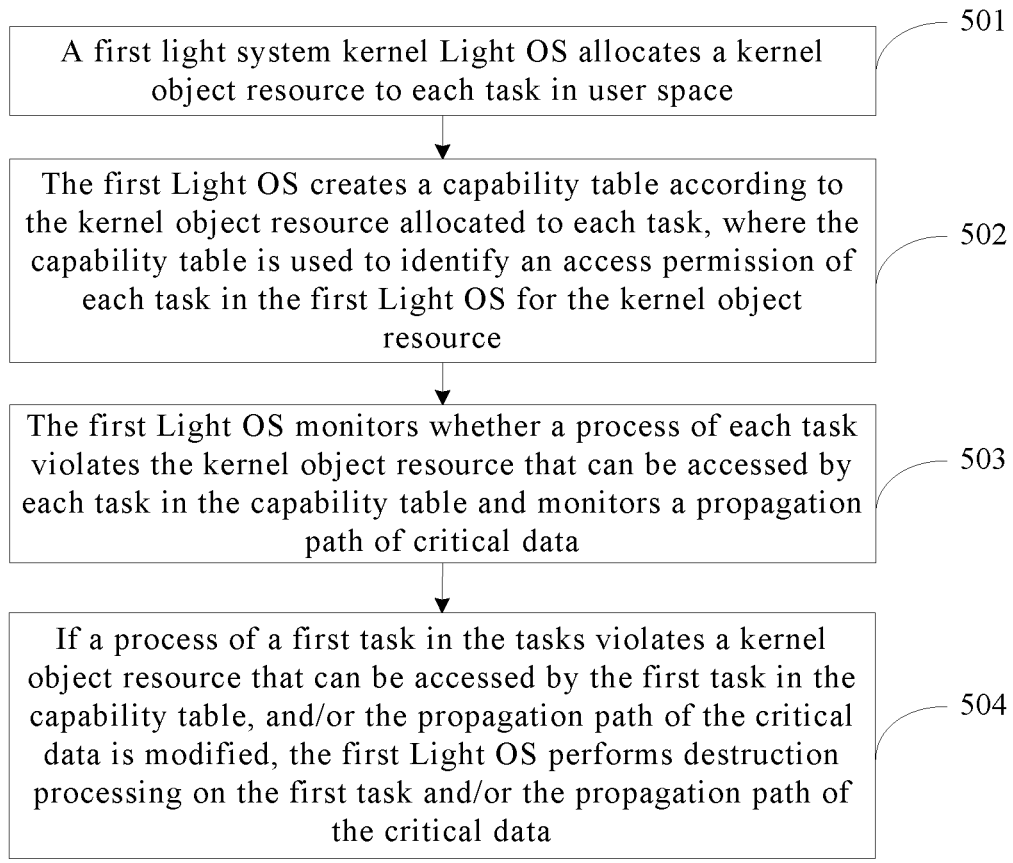
FIG. 5 is a schematic flowchart diagram of a method for accessing physical resources by a Light OS according to an embodiment of the present disclosure.

For the foregoing system, the embodiment of the present disclosure provides a method for accessing physical resources, where the method is performed by a first Light OS, which ensures access permission for a kernel object resource by monitoring a capability operation of a task process in the first Light OS, and monitoring a propagation path of critical data. As shown in FIG. 5, specific steps include:

Step 501: The first light system kernel Light OS allocates a kernel object resource to each task in user space.

The kernel object resource exists in a form of an object (Object) after the Light OS encapsulates kernel resources (for example, a memory and a device).

Specifically, that a first Light OS allocates a kernel object resource to each task in user space is completed by a capability authorization module in the first Light OS, where the capability authorization module is a part of a capability mechanism. The capability authorization module decides access permission of task processes in the user space for each kernel object resource, and may dynamically adjust and allocate kernel object resources according to a requirement of a task process.

Step 502: The first Light OS creates a capability table according to the kernel object resource allocated to each task, where the capability table is used to identify access permission of each task in the first Light OS for the kernel object resource.

Step 503: The first Light OS monitors whether a process of each task violates the kernel object resource that can be accessed by each task in the capability table and monitors a propagation path of critical data.

Specifically, when a task in the first Light OS creates a child process, the child process of this task needs to inherit some or all of kernel object resources of a parent process, that is, access permission of all child processes of this task for the kernel object resources can never be higher than access permission of the parent process for the kernel object resources.

However, when inheriting the parent process, the child process may obtain access permission that does not belong to the parent process for a kernel object resource, and thereby obtain higher permission to perform an illegal operation on the system, when the task is intruded and tampered by a malicious user program. Therefore, the capability authorization module in the first Light OS monitors, by monitoring a capability flow of the task process, whether a child processes of each task violate a kernel object resource that can be accessed by the parent process in the capability table, and traces whether a propagation path of multiple pieces of critical data in the kernel is modified.

Step 504: The first Light OS performs destruction processing on the first task and/or the propagation path of the critical data, when a process of a first task in the tasks violates a kernel object resource that can be accessed by the first task in the capability table, and/or the propagation path of the critical data is modified.

Specifically, The first Light OS performs isolation or destruction processing on the task, which is not limited certainly, when the capability authorization module in the first Light OS detects that the child process of the task process violates the kernel object resource that can be accessed by the parent process, and/or that the propagation path of the critical data is modified.

Further, when the process of the first task in the tasks violates the kernel object resource that can be accessed by the first task in the capability table, and/or the propagation path of the critical data is modified, the method further includes:

recording information indicating that the process of the first task violates the kernel object resource that can be accessed by the task in the capability table, when detecting that the process of the first task in the tasks violates the kernel object resource that can be accessed by the first task in the capability table; and/or recording information indicating that the propagation path of the critical data is modified, when the propagation path of the critical data is modified.

The first Light OS in the foregoing Embodiment 2 ensures, by monitoring a capability operation of a task process in the first Light OS, access permission management of the task process in the first Light OS for a kernel object resource. The method may be implemented in an independent Light OS, or may be implemented in any step in the foregoing Embodiment 1.

In the method for accessing physical resources according to the embodiment of the present disclosure, by monitoring a capability operation of a task process of a Light OS, in a case in which a task process of the Light OS violates a kernel object resource that can be accessed by the task in a capability table and/or a propagation path of critical data is modified, the Light OS performs exception handling on the task and/or the propagation path of the critical data, thereby ensuring access permission management of the task process in the Light OS for the kernel object resource, and further ensuring robustness of the Light OS against an untrusted task.

Embodiment 3

Figure 6:
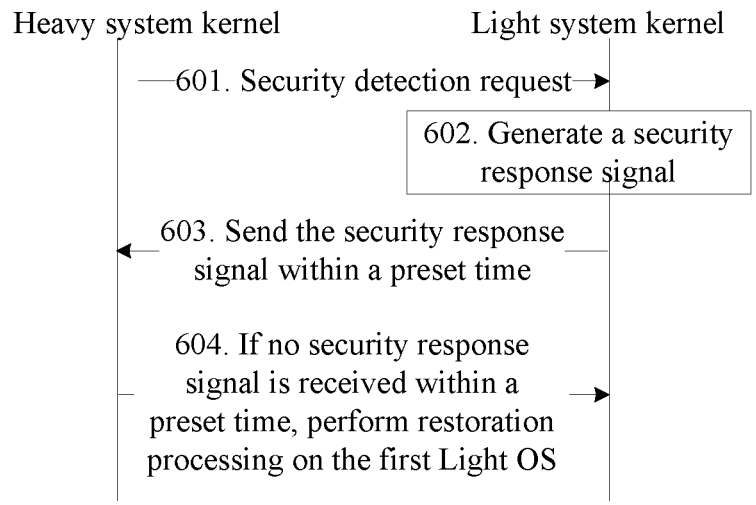
FIG. 6 is a schematic flowchart diagram of a method for performing security detection on a Light OS by a Heavy OS according to an embodiment of the present disclosure.

For the foregoing system, the embodiment of the present disclosure provides a method for accessing physical resources, where the method is performed by a Heavy OS, and security detection performed on a Light OS ensures functional completeness of the Light OS. As shown in FIG. 6, specific steps include:

Step 601: The heavy system kernel Heavy OS sends a security detection request to the first Light OS; correspondingly, the first Light OS receives the security detection request sent by the Heavy OS.

The security detection request is used to detect whether an exception occurs in the first Light OS; the Heavy OS may perform security detection on the first Light OS periodically or in real time, which is not limited certainly.

Further, before the Heavy OS performs security detection on the first Light OS, the method further includes: the Heavy OS periodically records capability table information of the first Light OS and propagation path information of critical data, so that when no security response signal sent by the first Light OS is received, restoration processing is performed on a capability table in the first Light OS and a propagation path of the critical data.

When functions of the first Light OS are complete and no exception occurs, steps 602 and 603 are performed; when functions of the first Light OS are incomplete and an exception occurs, steps 604 is performed.

Step 602: The first Light OS generates a security response signal according to the received security detection request.

The security response signal is used to indicate that the first Light OS is in a normal state.

Step 603: The first Light OS sends the security response signal to the Heavy OS within a preset time; correspondingly, the Heavy OS receives the security response signal sent by the first Light OS.

A responding module in the first Light OS responds to the security detection request of the Heavy OS.

Optionally, A security response signal is generated, when the first Light OS does not record information indicating that a task process in the first Light OS violates a kernel object resource that can be accessed by the task in the capability table and/or information indicating that the propagation path of the critical data is modified.

Specifically, it indicates that a capability authorization module in the first Light OS is complete, when the Heavy OS detects that the first Light OS does not record information indicating that a task process in the first Light OS violates a kernel object resource that can be accessed by the task in the capability table and/or information indicating that the propagation path of the critical data is modified, and the security response signal sent by the first Light OS is received within a preset time.

Optionally, a security response signal is not generated, when the first Light OS records information indicating that a task process in the first Light OS violates a kernel object resource that can be accessed by the task in the capability table and/or information indicating that the propagation path of the critical data is modified.

The responding module may be implemented in the capability authorization module, or may be independently implemented in the first Light OS, which is not limited certainly.

Step 604: The Heavy OS performs restoration processing on a capability table in the first Light OS and a propagation path of critical data, when no security response signal sent by the first Light OS is received within a preset time, where the capability table is used to identify access permission of each task in the Light OS for a kernel object resource.

Optionally, when the Heavy OS detects that the first Light OS does not record the information indicating that the task process in the first Light OS violates the kernel object resource that can be accessed by the task in the capability table and/or the information indicating that the propagation path of the critical data is modified, and the security response signal sent to the Heavy OS is not received within the preset time, the Heavy OS performs restoration processing on the capability table in the first Light OS and the propagation path of the critical data.

Optionally, when the Heavy OS detects that the first Light OS records the information indicating that the task process in the first Light OS violates the kernel object resource that can be accessed by the task in the capability table and/or the information indicating that the propagation path of the critical data is modified, the Heavy OS performs restoration processing on the capability table in the first Light OS and the propagation path of the critical data.

The restoration processing is resending the capability table information of the first Light OS and the propagation path information of the critical data that are periodically recorded by the Heavy OS to the first Light OS.

In the foregoing Embodiment 3, the Heavy OS performs security detection on the Light OS to ensure functional completeness of the Light OS; the method may be implemented independently, or may be implemented in any step in the foregoing Embodiment 1 and/or Embodiment 2.

In the method for accessing physical resources according to the embodiment of the present disclosure, a Heavy OS performs security detection on a Light OS, to perform restoration processing on a capability table in the first Light OS and a propagation path of critical data when detecting information indicating that a task process in the Light OS violates a kernel object resource that can be accessed by the task in the capability table and/or information indicating that the propagation path of the critical data is modified, and ensure functional completeness of the Light OS.

Figure 7:
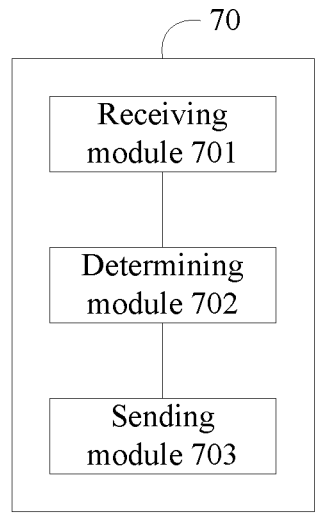
FIG. 7 is a schematic diagram of secure firmware for accessing physical resources according to an embodiment of the present disclosure.

The present disclosure provides secure firmware 70 for accessing physical resources, applied to a parallel virtualization system, where the system further includes a heavy system kernel Heavy OS and at least one light system kernel Light OS. As shown in FIG. 7, the secure firmware 70 includes:

a receiving module 701, configured to receive a physical address corresponding to a physical resource to be accessed by a first Light OS, where the first Light OS is any one of the at least one Light OS;

a determining module 702, configured to determine whether the physical address corresponding to the physical resource to be accessed by the first Light OS is out of bounds, where being out of bounds is that physical addresses corresponding to physical resources allocated by the Heavy OS to the first Light OS do not include the physical address corresponding to the physical resource to be accessed by the first Light OS; and a sending module 703, configured to: send an access continuity signal to the first Light OS, when the access of the first Light OS is within bounds, where the access continuity signal is used to indicate that the first Light OS can access the physical resource corresponding to the physical address; or send an access error signal to the first Light OS, when the access of the first Light OS is out of bounds, where the access error signal is used to indicate that the first Light OS cannot access the physical resource corresponding to the physical address.

Figure 8:
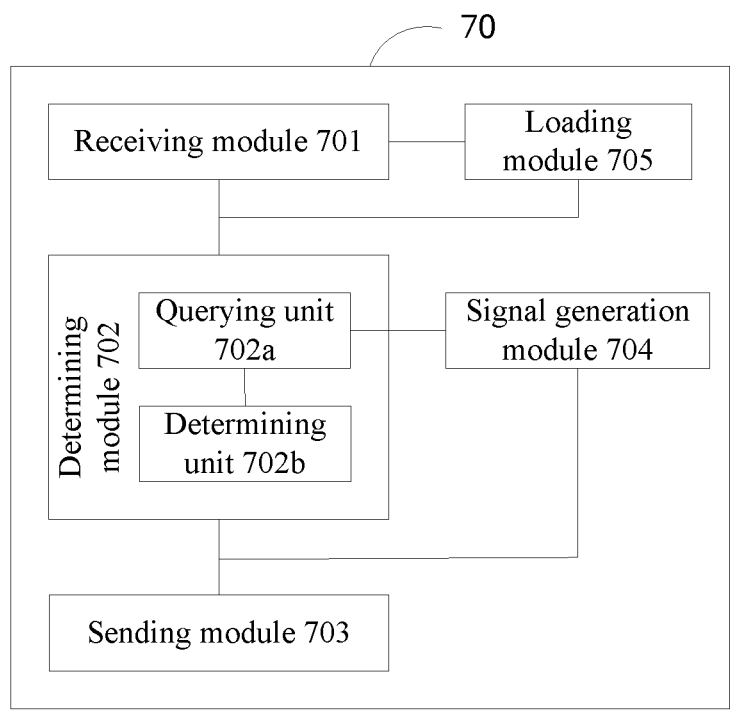
FIG. 8 is a schematic diagram of another secure firmware for accessing physical resources according to an embodiment of the present disclosure.

Optionally, as shown in FIG. 8, the determining module 702 includes a querying unit 702a and a determining unit 702b, where:

the querying unit 702a is configured to query whether stored second resource allocation mapping information includes the physical address corresponding to the physical resource to be accessed by the first Light OS; and the determining unit 702b is configured to determine, according to a query result of the querying unit 702a, whether the physical address corresponding to the physical resource to be accessed by the first Light OS is out of bounds; where the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS.

Optionally, the querying unit 702a is specifically configured to query whether physical addresses corresponding to the first Light OS in the currently stored second resource allocation mapping information include the physical address corresponding to the physical resource to be accessed by the first Light OS; and the determining unit 702b is specifically configured to determine, that the access of the first Light OS is within bounds, when the querying unit 702a finds that the physical addresses corresponding to the first Light OS in the currently stored second resource allocation mapping information include the physical address corresponding to the physical resource to be accessed by the first Light OS.

Optionally, as shown in FIG. 8, the secure firmware 70 further includes a signal generation module 704, where:

the querying unit 702a is further configured to query whether physical addresses corresponding to the first Light OS in the currently stored second resource allocation mapping information include the physical address corresponding to the physical resource to be accessed by the first Light OS;

the signal generation module 704 is configured to generate an access exception signal when the querying unit 702a finds that the physical addresses corresponding to the first Light OS in the currently stored second resource allocation mapping information do not include the physical address corresponding to the physical resource to be accessed by the first Light OS, where the access exception signal is used to indicate that the second resource allocation mapping information currently stored in the secure firmware does not include the physical address corresponding to the physical resource to be accessed by the first Light OS;

the sending module 703 is further configured to send the access exception signal obtained by the signal generation module 704 to the Heavy OS, so that the Heavy OS queries the first resource allocation mapping information;

the querying unit 702a is further configured to query, second resource allocation mapping information updated by the Heavy OS, when physical addresses corresponding to the first Light OS in the first resource allocation mapping information include the physical address corresponding to the physical resource to be accessed by the first Light OS; and the determining unit 702b is further configured to determine, according to a query result of the querying unit 702a, that the access of the first Light OS is within bounds, where the updated second resource allocation mapping information includes the physical address corresponding to the physical resource to be accessed by the first Light OS; or the receiving module 701 is further specifically configured to receive, an access violation instruction sent by the Heavy OS, when physical addresses corresponding to the first Light OS in the first resource allocation mapping information do not include the physical address corresponding to the physical resource to be accessed by the first Light OS; and the determining unit 702b is further configured to determine, according to the access violation instruction received by the receiving module 701, that the access of the first Light OS is out of bounds, where the access violation instruction is used to indicate that the first Light OS cannot access the physical resource corresponding to the physical address.

Optionally, as shown in FIG. 8, the secure firmware further includes a loading module 705, where:

the loading module 705 is configured to load first resource allocation mapping information;

the querying unit 702a is configured to query whether physical addresses corresponding to the first Light OS in the first resource allocation mapping information loaded by the loading module 705 include the physical address corresponding to the physical resource to be accessed by the first Light OS; and the determining unit 702b is configured to: determine that the access of the first Light OS is within bounds, when the physical addresses corresponding to the first Light OS in the first resource allocation mapping information queried by the querying unit 702a include the physical address corresponding to the physical resource to be accessed by the first Light OS; or determine that the access of the first Light OS is out of bounds, when the physical addresses corresponding to the first Light OS in the first resource allocation mapping information queried by the querying unit 702a do not include the physical address corresponding to the physical resource to be accessed by the first Light OS.

Optionally, the receiving module 701 is specifically configured to: receive the physical address corresponding to the physical resource to be accessed by the Light OS, where the physical address corresponding to the physical resource is sent by a cache controller; or receive the physical address corresponding to the physical resource to be accessed by the Light OS, where the physical address corresponding to the physical resource is sent by a memory management unit MMU.

Optionally, a data storage structure of the first resource allocation mapping information and the second resource allocation mapping information includes index items and data items, where a CPU identifier included in the Light OS is used as an index item, and a physical address of a physical resource allocated to the Light OS is used as a data item.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs.

Figure 9:
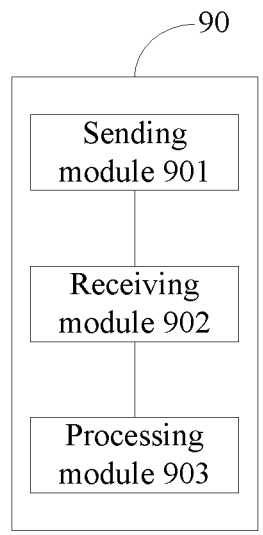
FIG. 9 is a schematic diagram of a light system kernel for accessing physical resources according to an embodiment of the present disclosure.

The present disclosure provides a light system kernel entity 90 for accessing physical resources, applied to a parallel virtualization system, where the system further includes a heavy system kernel Heavy OS and secure firmware, and the light system kernel entity 90 may include at least one CPU kernel. As shown in FIG. 9, the light system kernel entity 90 includes:

a sending module 901, configured to send an access request, so that the secure firmware receives a physical address corresponding to a physical resource to be accessed by a first Light OS, and determines whether access of the first Light OS is out of bounds, where the access request includes the physical address corresponding to the physical resource to be accessed by the first Light OS, and the first Light OS is any one of at least one Light OS;

a receiving module 902, configured to receive an access continuity signal or an access error signal sent by the secure firmware; and a handling module 903, configured to: access the physical resource corresponding to the physical address, when the receiving module 902 receives the access continuity signal; or perform exception handling on a task that initiates the access, when the receiving module 902 receives the access error signal, where the exception handling is used to instruct the first Light OS to stop accessing the physical resource corresponding to the physical address and destroy the access request.

Figure 10:
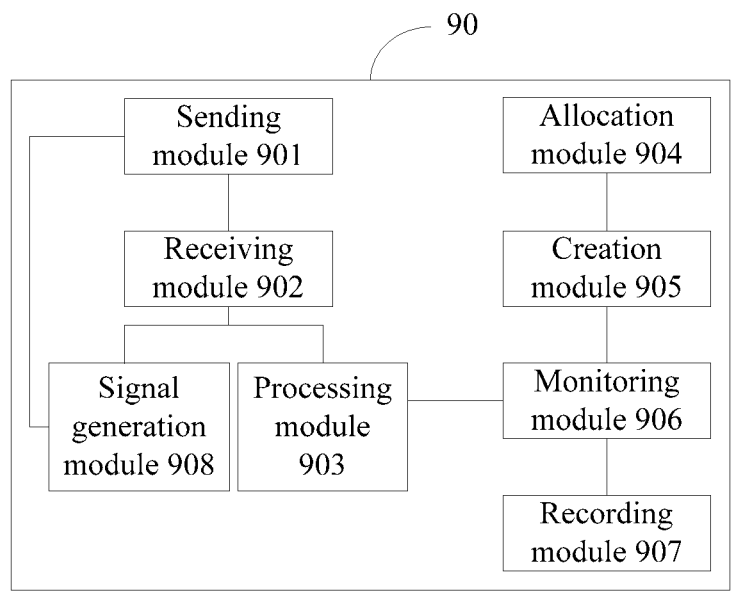
FIG. 10 is a schematic diagram of another light system kernel for accessing physical resources according to an embodiment of the present disclosure.

Optionally, as shown in FIG. 10, the light system kernel entity 90 further includes:

an allocation module 904, configured to allocate a kernel object resource to each task in user space;

a creation module 905, configured to create a capability table according to the kernel object resource that is allocated by the allocation module 904 to each task, where the capability table is used to identify access permission of each task in the Light OS for the kernel object resource; and a monitoring module 906, configured to monitor whether a process of each task violates the kernel object resource that can be accessed by each task in the capability table obtained by the creation module 905 and monitor a propagation path of critical data; where the handling module 903 is further configured to: perform destruction processing on the first task and/or the propagation path of the critical data, when the monitoring module 906 detects that a process of a first task in the tasks violates a kernel object resource that can be accessed by the first task in the capability table, and/or the propagation path of the critical data is modified.

Optionally, as shown in FIG. 10, the light system kernel entity 90 further includes a recording module 907, where:

the recording module 907 is configured to: record information indicating that the process of the first task violates the kernel object resource that can be accessed by the task in the capability table, when the monitoring module 906 detects that the process of the first task in the tasks violates the kernel object resource that can be accessed by the first task in the capability table; and/or record information indicating that the propagation path of the critical data is modified, when the monitoring module 906 detects that the propagation path of the critical data is modified.

Optionally, as shown in FIG. 10, the light system kernel entity 90 further includes a signal generation module 908, where:

the receiving module 902 is further configured to receive a security detection request sent by the Heavy OS, where the security detection request is used to detect whether an exception occurs in the first Light OS;

the signal generation module 908 is configured to generate a security response signal according to the security detection request received by the receiving module 902, where the security response signal is used to indicate that the first Light OS is in a normal state; and the sending module 901 is further configured to send the security response signal generated by the signal generation module to the Heavy OS within a preset time.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, each independent Light OS ensures, by monitoring a capability operation of a task process, access permission of the task process in the Light OS for a kernel object resource, therefore further ensuring robustness of the Light OS against an untrusted task. In addition, a Heavy OS performs security detection on the Light OS to ensure functional completeness of the Light OS.

Figure 11:
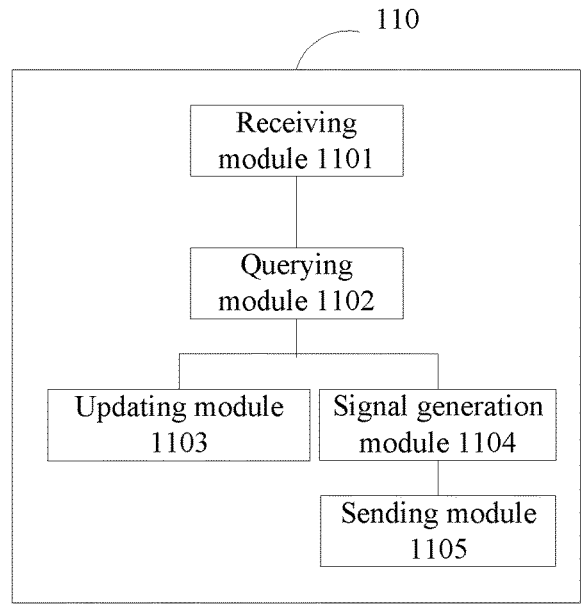
FIG. 11 is a schematic diagram of a heavy system kernel for accessing physical resources according to an embodiment of the present disclosure.

The present disclosure provides a heavy system kernel entity 110 for accessing physical resources, applied to a parallel virtualization system, where the system further includes at least one light system kernel Light OS and secure firmware, and the heavy system kernel entity 110 may include at least one CPU kernel. As shown in FIG. 11, the heavy system kernel entity 110 includes:

a receiving module 1101, configured to receive an access exception signal fed back by the secure firmware, where the access exception signal is used to indicate that second resource allocation mapping information currently stored in the secure firmware does not include a physical address corresponding to a physical resource to be accessed by a first Light OS, the first Light OS is any one of the at least one Light OS, and the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS;

a querying module 1102, configured to query, according to the access exception signal received by the receiving module 1101, whether physical addresses corresponding to the first Light OS in the first resource allocation mapping information include the physical address corresponding to the physical resource to be accessed by the first Light OS; and an updating module 1103, configured to update a correspondence between the first Light OS and the physical address corresponding to the physical resource to be accessed by the first Light OS, to the second resource allocation mapping information stored in the secure firmware, when the querying module 1102 finds that the physical addresses corresponding to the first Light OS include the physical address corresponding to the physical resource to be accessed by the first Light OS, so that the secure firmware determines, according to the updated second resource allocation mapping information, whether the physical address corresponding to the physical resource to be accessed by the first Light OS is out of bounds; or a signal generation module 1104, configured to generate an access violation instruction, when the physical addresses corresponding to the first Light OS do not include the physical address corresponding to the physical resource to be accessed by the first Light OS; and a sending module 1105, configured to send the access violation instruction generated by the signal generation module 1104 to the secure firmware, where the access violation instruction is used to indicate that the first Light OS cannot access the physical resource corresponding to the physical address.

Figure 12:
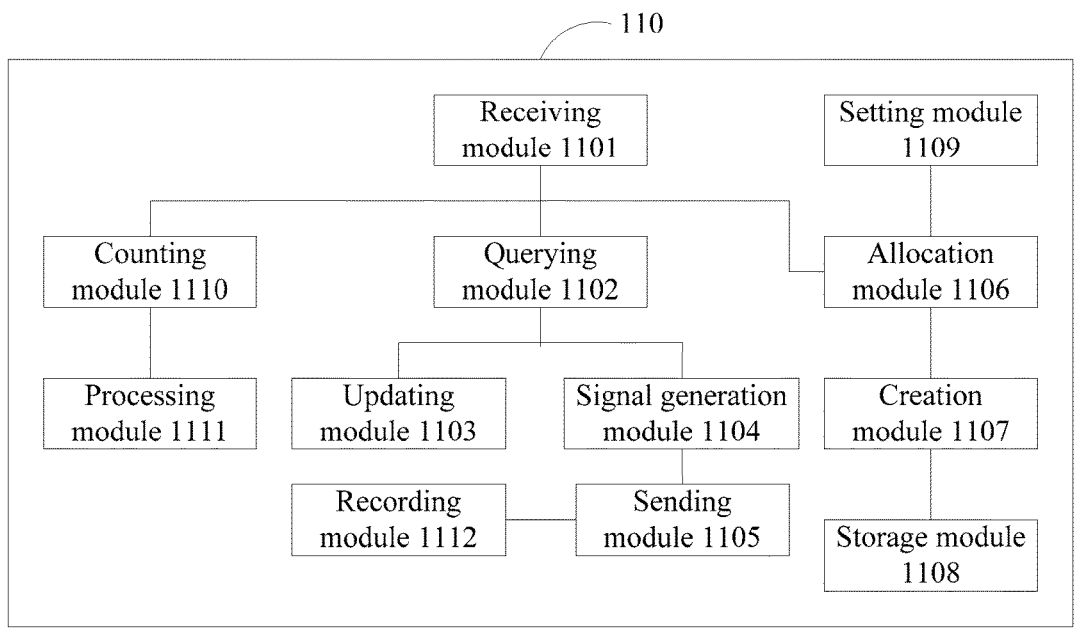
FIG. 12 is a schematic diagram of another heavy system kernel for accessing physical resources according to an embodiment of the present disclosure.

Optionally, as shown in FIG. 12, the heavy system kernel entity 110 further includes:

an allocation module 1106, configured to allocate the physical resources to each Light OS;

a creation module 1107, configured to generate the first resource allocation mapping information according to the physical resources that are allocated by the allocation module 1106 to each Light OS, and store the first resource allocation mapping information; and a storage module 1108, configured to store all or some of the first resource allocation mapping information generated by the creation module 1107 as the second resource allocation mapping information in the secure firmware.

Optionally, as shown in FIG. 12, the heavy system kernel entity 110 further includes a setting module 1109, where:

the setting module 1109 is configured to perform an initialization setting on the secure firmware before the allocation module 1106 allocates the physical resources to each Light OS, where the initialization setting includes: setting a capacity for storing the second resource allocation mapping information in the secure firmware; and the storage module 1108 is further configured to store all or some of the first resource allocation mapping information as the second resource allocation mapping information in the secure firmware according to the capacity set by the setting module 1109.

Optionally, the setting module 1109 is further configured to bind the secure firmware with the Heavy OS, so that the secure firmware stores or updates the second resource allocation mapping information only under control of the Heavy OS, and that the secure firmware feeds back the access exception signal only to the Heavy OS.

Optionally, as shown in FIG. 12, the heavy system kernel entity further includes a counting module 1110 and a handling module 1111, where:

the counting module 1110 is configured to count, after the receiving module 1101 receives the access exception signal fed back by the secure firmware, the number of times the secure firmware feeds back the access exception signal of the first Light OS; and the handling module 1111 is configured to destroy an exceptional access task in the first Light OS, when the number of times obtained by the counting module 1110 exceeds a preset threshold.

Optionally, the sending module 1105 is further configured to sends a security detection request to the first Light OS, where the security detection request is used to detect whether an exception occurs in the first Light OS; and the receiving module 1101 is further configured to receive, within a preset time, a security response signal sent by the first Light OS, where the security response signal is used to indicate that the first Light OS is in a normal state; or the handling module 1111 is further configured to perform restoration processing on a capability table in the first Light OS and a propagation path of critical data, when no security response signal sent by the first Light OS is received within a preset time, where the capability table is used to identify access permission of each task in the Light OS for a kernel object resource.

Optionally, as shown in FIG. 12, the heavy system kernel entity 110 further includes a recording module 1112, where:

the recording module 1112 is configured to periodically record capability table information of the first Light OS and propagation path information of the critical data before the sending module 1105 sends the security detection request to the first Light OS.

Optionally, a data storage structure of the first resource allocation mapping information and the second resource allocation mapping information includes index items and data items, where a CPU identifier included in the Light OS is used as an index item, and a physical address of a physical resource allocated to the Light OS is used as a data item.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, the Heavy OS performs security detection on the Light OS to ensure functional completeness of the Light OS.

The present disclosure provides a system for accessing physical resources, where the system includes the secure firmware shown in FIG. 7 or FIG. 8, the light system kernel entity shown in FIG. 9 or FIG. 10, and the heavy system kernel entity shown in FIG. 11 or FIG. 12.

In the embodiment of the present disclosure, secure firmware for accessing physical resources is added, so that when a Light OS in the multi-kernel operating system initiates physical resource access, the secure firmware verifies validity of memory access by the Light OS, to restrict access to physical resources of other Light OSs by the Light OS and ensure security of accessing physical resources among the Light OSs. Further, each independent Light OS ensures, by monitoring a capability operation of a task process, access permission of the task process in the Light OS for a kernel object resource, therefore further ensuring robustness of the Light OS against an untrusted task. In addition, a Heavy OS performs security detection on the Light OS to ensure functional completeness of the Light OS.

Figure 13:
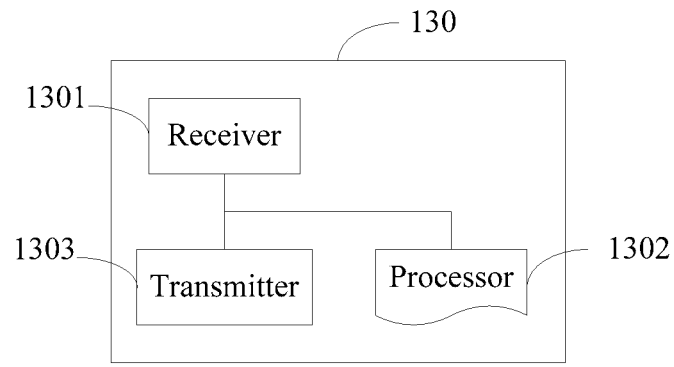
FIG. 13 is a schematic diagram of an entity apparatus of secure firmware for accessing physical resources according to an embodiment of the present disclosure.

The present disclosure provides secure firmware 130 for accessing physical resources. As shown in FIG. 13, the secure firmware 130 includes a receiver 1301, a processor 1302, and a transmitter 1303.

The receiver 1301 is configured to receive a physical address corresponding to a physical resource to be accessed by a first Light OS, where the first Light OS is any one of at least one Light OS.

The processor 1302 is configured to determine whether the physical address received by the receiver 1301 and corresponding to the physical resource to be accessed by the first Light OS is out of bounds, where being out of bounds is that physical addresses corresponding to physical resources allocated by the Heavy OS to the first Light OS do not include the physical address corresponding to the physical resource to be accessed by the first Light OS.

The transmitter 1303 is configured to: send an access continuity signal to the first Light OS, when the access of the first Light OS is within bounds, where the access continuity signal is used to indicate that the first Light OS can access the physical resource corresponding to the physical address; or send an access error signal to the first Light OS, when the access of the first Light OS is out of bounds, where the access error signal is used to indicate that the first Light OS cannot access the physical resource corresponding to the physical address.

Optionally, the processor 1302 is specifically configured to query whether stored second resource allocation mapping information includes the physical address corresponding to the physical resource to be accessed by the first Light OS, and determine whether the physical address corresponding to the physical resource to be accessed by the first Light OS is out of bounds, where the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS.

Optionally, the processor 1302 is specifically configured to query whether physical addresses corresponding to the first Light OS in the currently stored second resource allocation mapping information include the physical address corresponding to the physical resource to be accessed by the first Light OS; and determine that the access of the first Light OS is within bounds, when the physical addresses corresponding to the first Light OS in the second resource allocation mapping information currently stored in the secure firmware include the physical address corresponding to the physical resource to be accessed by the first Light OS.

Optionally, the processor 1302 is specifically configured to query whether physical addresses corresponding to the first Light OS in the currently stored second resource allocation mapping information include the physical address corresponding to the physical resource to be accessed by the first Light OS; generate an access exception signal, when the physical addresses corresponding to the first Light OS in the second resource allocation mapping information currently stored in the secure firmware do not include the physical address corresponding to the physical resource to be accessed by the first Light OS, where the access exception signal is used to indicate that the second resource allocation mapping information currently stored in the secure firmware does not include the physical address corresponding to the physical resource to be accessed by the first Light OS;

the transmitter 1303 is specifically configured to send the access exception signal generated by the processor 1302 to the Heavy OS, so that the Heavy OS queries the first resource allocation mapping information; and the processor 1302 is specifically configured to: query, second resource allocation mapping information updated by the Heavy OS, and determine that the access of the first Light OS is within bounds, when physical addresses corresponding to the first Light OS in the first resource allocation mapping information include the physical address corresponding to the physical resource to be accessed by the first Light OS, where the updated second resource allocation mapping information includes the physical address corresponding to the physical resource to be accessed by the first Light OS; or the receiver 1301 is specifically configured to: receive an access violation instruction sent by the Heavy OS, when physical addresses corresponding to the first Light OS in the first resource allocation mapping information do not include the physical address corresponding to the physical resource to be accessed by the first Light OS; and the processor 1302 is specifically configured to determine, according to the access violation instruction received by the receiver 1301, that the access of the first Light OS is out of bounds, where the access violation instruction is used to indicate that the first Light OS cannot access the physical resource corresponding to the physical address.

Optionally, the processor 1302 is specifically configured to: load first resource allocation mapping information; query whether physical addresses corresponding to the first Light OS in the first resource allocation mapping information include the physical address corresponding to the physical resource to be accessed by the first Light OS; and determine that the access of the first Light OS is within bounds, when the physical addresses corresponding to the first Light OS in the first resource allocation mapping information include the physical address corresponding to the physical resource to be accessed by the first Light OS; or determine that the access of the first Light OS is out of bounds, when the physical addresses corresponding to the first Light OS in the first resource allocation mapping information do not include the physical address corresponding to the physical resource to be accessed by the first Light OS.

Optionally, the receiver 1301 is specifically configured to: receive the physical address corresponding to the physical resource to be accessed by the Light OS, where the physical address corresponding to the physical resource is sent by a cache controller; or receive the physical address corresponding to the physical resource to be accessed by the Light OS, where the physical address corresponding to the physical resource is sent by a memory management unit MMU.

Optionally, a data storage structure of the first resource allocation mapping information and the second resource allocation mapping information includes index items and data items, where a CPU identifier included in the Light OS is used as an index item, and a physical address of a physical resource allocated to the Light OS is used as a data item.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs.

Figure 14:
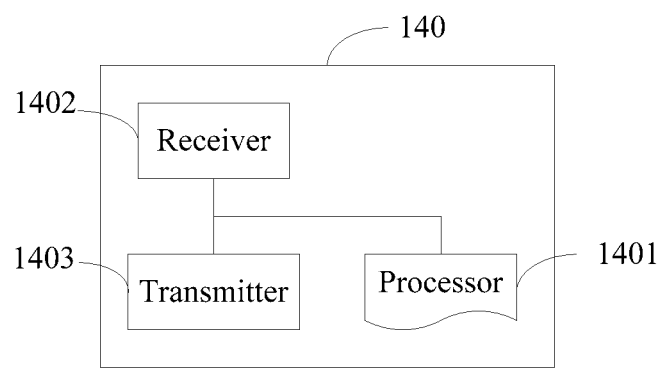
FIG. 14 is a schematic diagram of an entity apparatus of a light system kernel for accessing physical resources according to an embodiment of the present disclosure.

The present disclosure provides a light system kernel entity 140 for accessing physical resources. As shown in FIG. 14, the light system kernel entity 140 includes a processor 1401, a receiver 1402, and a transmitter 1403.

The transmitter 1403 is configured to send an access request, so that a secure firmware receives a physical address corresponding to a physical resource to be accessed by the first Light OS, and determines whether access of the first Light OS is out of bounds, where the access request includes the physical address corresponding to the physical resource to be accessed by the first Light OS, and the first Light OS is any one of the at least one Light OS.

The receiver 1402 is configured to receive an access continuity signal or an access error signal sent by the secure firmware, where the access continuity signal is used to indicate that the first Light OS can access the physical resource corresponding to the physical address, and the access error signal is used to indicate that the first Light OS cannot access the physical resource corresponding to the physical address.

The processor 1401 is configured to: access the physical resource corresponding to the physical address, when the receiver 1402 receives the access continuity signal.

The processor 1401 is further configured to: perform exception handling on a task that initiates the access, when the receiver 1402 receives the access error signal, where the exception handling is used to instruct the first Light OS to stop accessing the physical resource corresponding to the physical address and destroy the access request.

Optionally, the processor 1401 is further configured to: allocate a kernel object resource to each task in user space; create a capability table according to the kernel object resource allocated to each task, where the capability table is used to identify access permission of each task in the Light OS for the kernel object resource; monitor whether a process of each task violates the kernel object resource that can be accessed by each task in the capability table and monitor a propagation path of critical data; and perform destruction processing on the first task and/or the propagation path of the critical data, when a process of a first task in the tasks violates a kernel object resource that can be accessed by the first task in the capability table, and/or the propagation path of the critical data is modified.

Optionally, the processor 1401 is further configured to: record information indicating that the process of the first task violates the kernel object resource that can be accessed by the task in the capability table, when detecting that the process of the first task in the tasks violates the kernel object resource that can be accessed by the first task in the capability table; and/or record information indicating that the propagation path of the critical data is modified, when the propagation path of the critical data is modified.

Optionally, the receiver 1402 is further configured to receive a security detection request sent by the Heavy OS, where the security detection request is used to detect whether an exception occurs in the first Light OS;

the processor 1401 is further configured to generate a security response signal according to the security detection request received by the receiver 1402, where the security response signal is used to indicate that the first Light OS is in a normal state; and the transmitter 1403 is further configured to send the security response signal generated by the processor 1401 to the Heavy OS within a preset time.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, each independent Light OS ensures, by monitoring a capability operation of a task process, access permission of the task process in the Light OS for a kernel object resource, therefore further ensuring robustness of the Light OS against an untrusted task. In addition, a Heavy OS performs security detection on the Light OS to ensure functional completeness of the Light OS.

Figure 15:
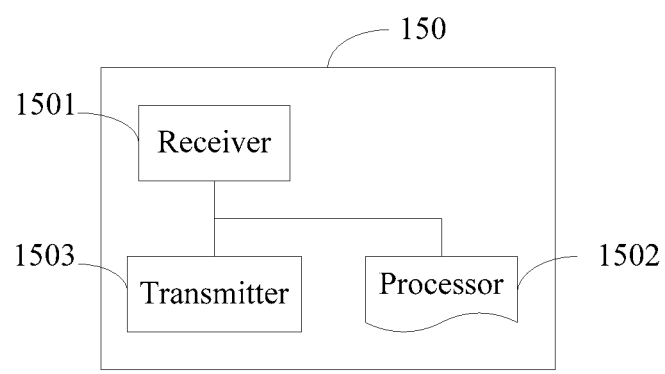
FIG. 15 is a schematic diagram of an entity apparatus of a heavy system kernel for accessing physical resources according to an embodiment of the present disclosure.

The present disclosure provides a heavy system kernel entity 150 for accessing physical resources. As shown in FIG. 15, the heavy system kernel entity 150 includes a receiver 1501, a processor 1502 and a transmitter 1503, where:

the receiver 1501 is configured to receive an access exception signal fed back by a secure firmware, where the access exception signal is used to indicate that second resource allocation mapping information currently stored in the secure firmware does not include a physical address corresponding to a physical resource to be accessed by the first Light OS, the first Light OS is any one of the at least one Light OS, and the second resource allocation mapping information includes all or some of first resource allocation mapping information, where the first resource allocation mapping information is stored in the Heavy OS, and is a correspondence between physical addresses corresponding to physical resources allocated by the Heavy OS to each Light OS and each Light OS;

the processor 1502 is configured to query, according to the access exception signal received by the receiver 1501, whether physical addresses corresponding to the first Light OS in the first resource allocation mapping information include the physical address corresponding to the physical resource to be accessed by the first Light OS; and update a correspondence between the first Light OS and the physical address corresponding to the physical resource to be accessed by the first Light OS, to the second resource allocation mapping information stored in the secure firmware, when the physical addresses corresponding to the first Light OS include the physical address corresponding to the physical resource to be accessed by the first Light OS, so that the secure firmware determines, according to the updated second resource allocation mapping information, whether the physical address corresponding to the physical resource to be accessed by the first Light OS is out of bounds; or the processor 1502 is further configured to generate an access violation instruction when the physical addresses corresponding to the first Light OS do not include the physical address corresponding to the physical resource to be accessed by the first Light OS; and the transmitter 1503 is configured to send the access violation instruction generated by the processor 1502 to the secure firmware, where the access violation instruction is used to indicate that the first Light OS cannot access the physical resource corresponding to the physical address.

Optionally, the processor 1502 is further configured to: allocate the physical resources to each Light OS before the receiver 1501 receives the access exception signal fed back by the secure firmware; generate the first resource allocation mapping information according to the physical resources that are allocated to each Light OS, and store the first resource allocation mapping information; and store all or some of the first resource allocation mapping information as the second resource allocation mapping information in the secure firmware.

Optionally, the processor 1502 is further configured to perform an initialization setting on the secure firmware before the physical resources are allocated to each Light OS, where the initialization setting includes: setting a capacity for storing the second resource allocation mapping information in the secure firmware; and store all or some of the first resource allocation mapping information as the second resource allocation mapping information in the secure firmware according to the capacity.

Optionally, the processor 1502 is further configured to bind the secure firmware with the Heavy OS, so that the secure firmware stores or updates the second resource allocation mapping information only under control of the Heavy OS, and that the secure firmware feeds back the access exception signal only to the Heavy OS.

Optionally, the processor 1502 is further configured to count, after the receiver 1501 receives the access exception signal fed back by the secure firmware, the number of times the secure firmware feeds back the access exception signal of the first Light OS; and destroy an exceptional access task in the first Light OS when the number of times exceeds a preset threshold.

Optionally, the transmitter 1503 is further configured to send a security detection request to the first Light OS, where the security detection request is used to detect whether an exception occurs in the first Light OS; and the receiver 1501 is further configured to receive, within a preset time, a security response signal sent by the first Light OS, where the security response signal is used to indicate that the first Light OS is in a normal state; or the processor 1502 is further configured to perform restoration processing on a capability table in the first Light OS and a propagation path of critical data when no security response signal sent by the first Light OS is received within a preset time, where the capability table is used to identify access permission of each task in the Light OS for a kernel object resource.

Optionally, the processor 1502 is further configured to periodically record capability table information of the first Light OS and propagation path information of the critical data before the transmitter 1503 sends the security detection request to the first Light OS.

Optionally, a data storage structure of the first resource allocation mapping information and the second resource allocation mapping information includes index items and data items, where a CPU identifier included in the Light OS is used as an index item, and a physical address of a physical resource allocated to the Light OS is used as a data item.

In the embodiment of the present disclosure, secure firmware for accessing physical resources is added, so that when a Light OS initiates physical resource access, the secure firmware verifies validity of memory access by the light system kernel Light OS in a multi-kernel operating system, to restrict access to physical resources of other Light OSs by the Light OS and ensure security of accessing physical resources among the Light OSs. Further, the Heavy OS performs security detection on the Light OS to ensure functional completeness of the Light OS.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for accessing physical resources, applied in a parallel virtualization system, wherein the system comprises a heavy system kernel (Heavy OS), at least one light system kernel (Light OS), and secure firmware, and the method comprises:
    receiving, by the secure firmware, a physical address corresponding to a physical resource to be accessed by a first Light OS, wherein the first Light OS is any one of the at least one Light OS;
    determining, by the secure firmware, whether the physical address corresponding to the physical resource to be accessed by the first Light OS is out of bounds, wherein being out of bounds is that physical addresses corresponding to physical resources allocated by the Heavy OS to the first Light OS do not comprise the physical address corresponding to the physical resource to be accessed by the first Light OS;
    sending, by the secure firmware, an access error signal to the first Light OS, when the physical address corresponding to the physical resource to be accessed by the first Light OS is out of bounds, wherein the access error signal is used to indicate that the first Light OS cannot access the physical resource corresponding to the physical address; and
    sending, by the secure firmware, an access continuity signal to the first Light OS, when the physical address corresponding to the physical resource to be accessed by the first Light OS is within bounds, wherein the access continuity signal is used to indicate that the first Light OS can access the physical resource corresponding to the physical address;
    wherein the determining, by the secure firmware, whether the physical address corresponding to the physical resource to be accessed by the first Light OS is out of bounds, comprises:
    querying, by the secure firmware, whether stored second resource allocation mapping information comprises the physical address corresponding to the physical resource to be accessed by the first Light OS, and determining whether the physical address corresponding to the physical resource to be accessed by the first Light OS is out of bounds, wherein the second resource allocation mapping information comprises all or some of first resource allocation mapping information, wherein the first resource allocation mapping information is stored in the Heavy OS, and is a correspondence between physical addresses corresponding to physical resources allocated by the Heavy OS to each Light OS and each Light OS.

2. The method according to claim 1, wherein:

the querying, by the secure firmware, whether stored second resource allocation mapping information comprises the physical address corresponding to the physical resource to be accessed by the first Light OS, and determining whether the physical address corresponding to the physical resource to be accessed by the first Light OS is out of bounds, comprises:

querying, by the secure firmware, whether physical addresses corresponding to the first Light OS in the currently stored second resource allocation mapping information comprise the physical address corresponding to the physical resource to be accessed by the first Light OS; and determining, by the secure firmware, that the physical address corresponding to the physical resource to be accessed by the first Light OS is within bounds, when the physical addresses corresponding to the first Light OS in the second resource allocation mapping information currently stored in the secure firmware comprise the physical address corresponding to the physical resource to be accessed by the first Light OS.

3. The method according to claim 1, wherein:

the querying, by the secure firmware, whether stored second resource allocation mapping information comprises the physical address corresponding to the physical resource to be accessed by the first Light OS, and determining whether the physical address corresponding to the physical resource to be accessed by the first Light OS is out of bounds, comprises:

querying, by the secure firmware, whether physical addresses corresponding to the first Light OS in the currently stored second resource allocation mapping information comprise the physical address corresponding to the physical resource to be accessed by the first Light OS;

generating, by the secure firmware, an access exception signal, when the physical addresses corresponding to the first Light OS in the second resource allocation mapping information currently stored in the secure firmware do not comprise the physical address corresponding to the physical resource to be accessed by the first Light OS, wherein the access exception signal is used to indicate that the second resource allocation mapping information currently stored in the secure firmware does not comprise the physical address corresponding to the physical resource to be accessed by the first Light OS;

sending the access exception signal to the Heavy OS, so that the Heavy OS queries the first resource allocation mapping information; and querying, by the secure firmware, second resource allocation mapping information updated by the Heavy OS, and determining that the physical address corresponding to the physical resource to be accessed by the first Light OS is within bounds, when a query result of the Heavy OS indicating that physical addresses corresponding to the first Light OS in the first resource allocation mapping information comprise the physical address corresponding to the physical resource to be accessed by the first Light OS, wherein the updated second resource allocation mapping information comprises the physical address corresponding to the physical resource to be accessed by the first Light OS.

4. The method according to claim 1, wherein:

the querying, by the secure firmware, whether stored second resource allocation mapping information comprises the physical address corresponding to the physical resource to be accessed by the first Light OS, and determining whether the physical address corresponding to the physical resource to be accessed by the first Light OS is out of bounds, comprises:

querying, by the secure firmware, whether physical addresses corresponding to the first Light OS in the currently stored second resource allocation mapping information comprise the physical address corresponding to the physical resource to be accessed by the first Light OS;

generating, by the secure firmware, an access exception signal, when the physical addresses corresponding to the first Light OS in the second resource allocation mapping information currently stored in the secure firmware do not comprise the physical address corresponding to the physical resource to be accessed by the first Light OS, wherein the access exception signal is used to indicate that the second resource allocation mapping information currently stored in the secure firmware does not comprise the physical address corresponding to the physical resource to be accessed by the first Light OS;

sending the access exception signal to the Heavy OS, so that the Heavy OS queries the first resource allocation mapping information; and receiving, by the secure firmware, an access violation instruction sent by the Heavy OS, and determining, according to the received access violation instruction, that the physical address corresponding to the physical resource to be accessed by the first Light OS is out of bounds, when the query result of the Heavy OS indicating that physical addresses corresponding to the first Light OS in the first resource allocation mapping information do not comprise the physical address corresponding to the physical resource to be accessed by the first Light OS, wherein the access violation instruction is used to indicate that the first Light OS cannot access the physical resource corresponding to the physical address.

5. A method for accessing physical resources, applied in a parallel virtualization system, wherein the system comprises a heavy system kernel (Heavy OS), at least one light system kernel (Light OS), and secure firmware, and the method comprises:

receiving, by the secure firmware, a physical address corresponding to a physical resource to be accessed by a first Light OS, wherein the first Light OS is any one of the at least one Light OS;

determining, by the secure firmware, whether the physical address corresponding to the physical resource to be accessed by the first Light OS is out of bounds, wherein being out of bounds is that physical addresses corresponding to physical resources allocated by the Heavy OS to the first Light OS do not comprise the physical address corresponding to the physical resource to be accessed by the first Light OS;

sending, by the secure firmware, an access error signal to the first Light OS, when the physical address corresponding to the physical resource to be accessed by the first Light OS is out of bounds, wherein the access error signal is used to indicate that the first Light OS cannot access the physical resource corresponding to the physical address; and sending, by the secure firmware, an access continuity signal to the first Light OS, when the physical address corresponding to the physical resource to be accessed by the first Light OS is within bounds, wherein the access continuity signal is used to indicate that the first Light OS can access the physical resource corresponding to the physical address, wherein the determining, by the secure firmware, whether the physical address corresponding to the physical resource to be accessed by the first Light OS is out of bounds, comprises:

loading, by the secure firmware, first resource allocation mapping information;

querying, by the secure firmware, whether physical addresses corresponding to the first Light OS in the first resource allocation mapping information comprise the physical address corresponding to the physical resource to be accessed by the first Light OS; and determining, by the secure firmware, that the physical address corresponding to the physical resource to be accessed by the first Light OS is out of bounds, when the physical addresses corresponding to the first Light OS in the first resource allocation mapping information do not comprise the physical address corresponding to the physical resource to be accessed by the first Light OS.

6. A method for accessing physical resources, applied in a parallel virtualization system, wherein the system comprises a heavy system kernel (Heavy OS), at least one light system kernel (Light OS), and secure firmware, and the method comprises:

receiving, by the secure firmware, a physical address corresponding to a physical resource to be accessed by a first Light OS, wherein the first Light OS is any one of the at least one Light OS;

determining, by the secure firmware, whether the physical address corresponding to the physical resource to be accessed by the first Light OS is out of bounds, wherein being out of bounds is that physical addresses corresponding to physical resources allocated by the Heavy OS to the first Light OS do not comprise the physical address corresponding to the physical resource to be accessed by the first Light OS;

sending, by the secure firmware, an access error signal to the first Light OS, when the physical address corresponding to the physical resource to be accessed by the first Light OS is out of bounds, wherein the access error signal is used to indicate that the first Light OS cannot access the physical resource corresponding to the physical address; and sending, by the secure firmware, an access continuity signal to the first Light OS, when the physical address corresponding to the physical resource to be accessed by the first Light OS is within bounds, wherein the access continuity signal is used to indicate that the first Light OS can access the physical resource corresponding to the physical address, wherein the determining, by the secure firmware, whether the physical address corresponding to the physical resource to be accessed by the first Light OS is out of bounds, comprises:

loading, by the secure firmware, first resource allocation mapping information;

querying, by the secure firmware, whether physical addresses corresponding to the first Light OS in the first resource allocation mapping information comprise the physical address corresponding to the physical resource to be accessed by the first Light OS; and determining, by the secure firmware, that the physical address corresponding to the physical resource to be accessed by the first Light OS is within bounds, when the physical addresses corresponding to the first Light OS in the first resource allocation mapping information comprise the physical address corresponding to the physical resource to be accessed by the first Light OS.

7. The method according to claim 1, wherein the receiving, by the secure firmware, a physical address corresponding to a physical resource to be accessed by a first Light OS, comprises:

receiving, by the secure firmware, the physical address corresponding to the physical resource to be accessed by the Light OS, wherein the physical address corresponding to the physical resource to be accessed by the Light OS is sent by a cache controller or a memory management unit (MMU).

8. The method according to claim 1, wherein a data storage structure of a first resource allocation mapping information and a second resource allocation mapping information comprises index items and data items, wherein a CPU identifier comprised in the Light OS is used as an index item, and a physical address of a physical resource allocated to the Light OS is used as a data item.

9. Secure firmware for accessing physical resources, applied in a parallel virtualization system, wherein the system comprises a heavy system kernel (Heavy OS) and at least one light system kernel (Light OS), and the secure firmware includes a receiver, a processor, and a transmitter;

the receiver is configured to receive a physical address corresponding to a physical resource to be accessed by a first Light OS, wherein the first Light OS is any one of at least one Light OS;

the processor is configured to determine whether the physical address received by the receiver and corresponding to the physical resource to be accessed by the first Light OS is out of bounds, wherein being out of bounds is that physical addresses corresponding to physical resources allocated by the Heavy OS to the first Light OS do not include the physical address corresponding to the physical resource to be accessed by the first Light OS; and the transmitter is configured to:

send an access error signal to the first Light OS, when the physical address corresponding to the physical resource to be accessed by the first Light OS is out of bounds, wherein the access error signal is used to indicate that the first Light OS cannot access the physical resource corresponding to the physical address; and send an access continuity signal to the first Light OS, when the physical address corresponding to the physical resource to be accessed by the first Light OS is within bounds, wherein the access continuity signal is used to indicate that the first Light OS can access the physical resource corresponding to the physical address; and the processor is further configured to query whether stored second resource allocation mapping information includes the physical address corresponding to the physical resource to be accessed by the first Light OS, and determine whether the physical address corresponding to the physical resource to be accessed by the first Light OS is out of bounds, wherein the second resource allocation mapping information includes all or some of first resource allocation mapping information, wherein the first resource allocation mapping information is stored in the Heavy OS, and is a correspondence between physical addresses corresponding to physical resources allocated by the Heavy OS to each Light OS and each Light OS.

10. The secure firmware according to claim 9, wherein the processor is configured to query whether physical addresses corresponding to the first Light OS in the currently stored second resource allocation mapping information include the physical address corresponding to the physical resource to be accessed by the first Light OS; and determine that the physical address corresponding to the physical resource to be accessed by the first Light OS is within bounds, when the physical addresses corresponding to the first Light OS in the second resource allocation mapping information currently stored in the secure firmware include the physical address corresponding to the physical resource to be accessed by the first Light OS.

11. The secure firmware according to claim 9, wherein:
the processor is configured to query whether physical addresses corresponding to the first Light OS in the currently stored second resource allocation mapping information include the physical address corresponding to the physical resource to be accessed by the first Light OS; generate an access exception signal, when the physical addresses corresponding to the first Light OS in the second resource allocation mapping information currently stored in the secure firmware do not include the physical address corresponding to the physical resource to be accessed by the first Light OS, wherein the access exception signal is used to indicate that the second resource allocation mapping information currently stored in the secure firmware does not include the physical address corresponding to the physical resource to be accessed by the first Light OS;
the transmitter is configured to send the access exception signal generated by the processor to the Heavy OS, so that the Heavy OS queries the first resource allocation mapping information; and
the processor is configured to: query, second resource allocation mapping information updated by the Heavy OS, and determine that the physical address corresponding to the physical resource to be accessed by the first Light OS is within bounds, when a query result of the Heavy OS indicating that physical addresses corresponding to the first Light OS in the first resource allocation mapping information include the physical address corresponding to the physical resource to be accessed by the first Light OS, wherein the updated second resource allocation mapping information includes the physical address corresponding to the physical resource to be accessed by the first Light OS.

12. The secure firmware according to claim 9, wherein:
the processor is configured to query whether physical addresses corresponding to the first Light OS in the currently stored second resource allocation mapping information include the physical address corresponding to the physical resource to be accessed by the first Light OS; generate an access exception signal, when the physical addresses corresponding to the first Light OS in the second resource allocation mapping information currently stored in the secure firmware do not include the physical address corresponding to the physical resource to be accessed by the first Light OS, wherein the access exception signal is used to indicate that the second resource allocation mapping information currently stored in the secure firmware does not include the physical address corresponding to the physical resource to be accessed by the first Light OS;
the transmitter is configured to send the access exception signal generated by the processor to the Heavy OS, so that the Heavy OS queries the first resource allocation mapping information;
the receiver is configured to: receive an access violation instruction sent by the Heavy OS, when a query result of the Heavy OS indicating that physical addresses corresponding to the first Light OS in the first resource allocation mapping information do not include the physical address corresponding to the physical resource to be accessed by the first Light OS; and
the processor is configured to determine, according to the access violation instruction received by the receiver, that the physical address corresponding to the physical resource to be accessed by the first Light OS is out of bounds, wherein the access violation instruction is used to indicate that the first Light OS cannot access the physical resource corresponding to the physical address.

13. Secure firmware for accessing physical resources, applied in a parallel virtualization system, wherein the system comprises a heavy system kernel (Heavy OS) and at least one light system kernel (Light OS), and the secure firmware includes a receiver, a processor, and a transmitter;
the receiver is configured to receive a physical address corresponding to a physical resource to be accessed by a first Light OS, wherein the first Light OS is any one of at least one Light OS;
the processor is configured to determine whether the physical address received by the receiver and corresponding to the physical resource to be accessed by the first Light OS is out of bounds, wherein being out of bounds is that physical addresses corresponding to physical resources allocated by the Heavy OS to the first Light OS do not include the physical address corresponding to the physical resource to be accessed by the first Light OS; and
the transmitter is configured to:
send an access error signal to the first Light OS, when the physical address corresponding to the physical resource to be accessed by the first Light OS is out of bounds, wherein the access error signal is used to indicate that the first Light OS cannot access the physical resource corresponding to the physical address; and
send an access continuity signal to the first Light OS, when the physical address corresponding to the physical resource to be accessed by the first Light OS is within bounds, wherein the access continuity signal is used to indicate that the first Light OS can access the physical resource corresponding to the physical address,
wherein the processor is further configured to: load first resource allocation mapping information; query whether physical addresses corresponding to the first Light OS in the first resource allocation mapping information include the physical address corresponding to the physical resource to be accessed by the first Light OS; and determine that the physical address corresponding to the physical resource to be accessed by the first Light OS is within bounds, when the physical addresses corresponding to the first Light OS in the first resource allocation mapping information include the physical address corresponding to the physical resource to be accessed by the first Light OS.

14. Secure firmware for accessing physical resources, applied in a parallel virtualization system, wherein the system comprises a heavy system kernel (Heavy OS) and at least one light system kernel (Light OS), and the secure firmware includes a receiver, a processor, and a transmitter;
the receiver is configured to receive a physical address corresponding to a physical resource to be accessed by a first Light OS, wherein the first Light OS is any one of at least one Light OS;
the processor is configured to determine whether the physical address received by the receiver and corresponding to the physical resource to be accessed by the first Light OS is out of bounds, wherein being out of bounds is that physical addresses corresponding to physical resources allocated by the Heavy OS to the first Light OS do not include the physical address corresponding to the physical resource to be accessed by the first Light OS; and
the transmitter is configured to:
send an access error signal to the first Light OS, when the physical address corresponding to the physical resource to be accessed by the first Light OS is out of bounds, wherein the access error signal is used to indicate that the first Light OS cannot access the physical resource corresponding to the physical address; and
send an access continuity signal to the first Light OS, when the physical address corresponding to the physical resource to be accessed by the first Light OS is within bounds, wherein the access continuity signal is used to indicate that the first Light OS can access the physical resource corresponding to the physical address,
wherein the processor is further configured to: load first resource allocation mapping information; query whether physical addresses corresponding to the first Light OS in the first resource allocation mapping information include the physical address corresponding to the physical resource to be accessed by the first Light OS; and determine that the physical address corresponding to the physical resource to be accessed by the first Light OS is out of bounds, when the physical addresses corresponding to the first Light OS in the first resource allocation mapping information do not include the physical address corresponding to the physical resource to be accessed by the first Light OS.

15. The secure firmware according to claim 9, wherein the receiver is configured to receive the physical address corresponding to the physical resource to be accessed by the Light OS, where the physical address corresponding to the physical resource to be accessed by the Light OS is sent by a cache controller or a memory management unit (MMU).

16. The secure firmware according to claim 9, wherein a data storage structure of a first resource allocation mapping information and a second resource allocation mapping information comprises index items and data items, wherein a CPU identifier comprised in the Light OS is used as an index item, and a physical address of a physical resource allocated to the Light OS is used as a data item.

17. The secure firmware according to claim 13, wherein the receiver is configured to receive the physical address corresponding to the physical resource to be accessed by the Light OS, where the physical address corresponding to the physical resource to be accessed by the Light OS is sent by a cache controller or a memory management unit (MMU).

18. The secure firmware according to claim 14, wherein the receiver is configured to receive the physical address corresponding to the physical resource to be accessed by the Light OS, where the physical address corresponding to the physical resource to be accessed by the Light OS is sent by a cache controller or a memory management unit (MMU).

19. The method according to claim 5, wherein the receiving, by the secure firmware, a physical address corresponding to a physical resource to be accessed by a first Light OS, comprises:
receiving, by the secure firmware, the physical address corresponding to the physical resource to be accessed by the Light OS, wherein the physical address corresponding to the physical resource to be accessed by the Light OS is sent by a cache controller or a memory management unit (MMU).

20. The method according to claim 6, wherein the receiving, by the secure firmware, a physical address corresponding to a physical resource to be accessed by a first Light OS, comprises:
receiving, by the secure firmware, the physical address corresponding to the physical resource to be accessed by the Light OS, wherein the physical address corresponding to the physical resource to be accessed by the Light OS is sent by a cache controller or a memory management unit (MMU).

\* \* \* \* \*